(12) United States Patent
Gao et al.

(10) Patent No.: US 8,724,536 B2
(45) Date of Patent: May 13, 2014

(54) SYSTEM AND APPARATUS FOR POWER-EFFICIENTLY DELIVERING UPDATE INFORMATION TO DEVICES IN A BROADCAST NETWORK

(75) Inventors: Qiang Gao, San Diego, CA (US); Ralph Akram Gholmieh, San Diego, CA (US); An M. Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1074 days.

(21) Appl. No.: 12/683,907

(22) Filed: Jan. 7, 2010

(65) Prior Publication Data

US 2011/0165865 A1 Jul. 7, 2011

(51) Int. Cl.
*H04H 20/71* (2008.01)

(52) U.S. Cl.
USPC ......... 370/312; 370/390; 455/3.01; 455/3.02; 455/3.06; 455/515; 725/39; 725/62; 725/63; 725/68; 725/81; 725/97; 725/105; 725/114

(58) Field of Classification Search
USPC .............. 455/574, 566, 436, 3.01, 3.02, 3.06, 455/515; 370/230, 329, 206, 352, 312, 390; 725/39, 62, 63, 68, 81, 97, 105, 114
See application file for complete search history.

(56) References Cited

U.S. PATENT DOCUMENTS

| 8,233,421 | B2 * | 7/2012 | Wang et al. ............... 370/312 |
| 2005/0185608 | A1 * | 8/2005 | Lee et al. .................. 370/328 |
| 2006/0258410 | A1 | 11/2006 | Collins et al. |
| 2008/0170530 | A1 * | 7/2008 | Connors et al. ............ 370/312 |
| 2009/0183215 | A1 * | 7/2009 | McCartie et al. ........... 725/105 |
| 2009/0268656 | A1 | 10/2009 | Yousef |

OTHER PUBLICATIONS

International Search Report and Written Opinion—PCT/US2011/020411, ISA/EPO—Aug. 25, 2011.

* cited by examiner

*Primary Examiner* — Olumide T Ajibade Akonai
(74) *Attorney, Agent, or Firm* — Fulbright & Jaworski LLP

(57) ABSTRACT

Embodiments provide power-efficient mechanisms for communicating small amounts of information to receiver devices within a mobile broadcast system. A generic transport mechanism enables transmitting data relevant to upper layer protocols in a lower layer sub-channel so multiple information summary flows can share the same physical layer sub-channel. Data fields are added to the Overhead Information Service (OIS) channel to provide power-efficient logical channels for carrying the summary information. Data from the power-efficient logical channels are provided to an upper protocol layer that receives the information summary flows. Information summary flow may carry a version number of an information flow in the broadcast signal, codes or other information. Receiver devices periodically monitoring the OIS receive the information summary flows. Employing an embodiment, a receiver device can minimize power consumption because reception of the OIS can indicate whether any new information flows are available, obviating a need to periodically check information flows.

60 Claims, 13 Drawing Sheets

SYSTEM AND APPARATUS FOR POWER-EFFICIENTLY DELIVERING UPDATE INFORMATION TO DEVICES IN A BROADCAST NETWORK

BACKGROUND

Wireless communication technologies have seen explosive growth over the past few years. This growth has been fueled by wireless services providing freedom of movement to the mobile public, and cutting the tether to hardwired communication systems. As a result of service enhancements, the popularity of wireless services is expected to continue to grow rapidly. A recent addition to wireless communication services has been the ability to broadcast television and other content to mobile devices. Mobile multimedia broadcast services allow users to view TV programming, as well as receive mobile editions of news, entertainment, sports, business, and other programming, using their cell phone or other wireless mobile device configured to receive the mobile broadcast transmissions. The bandwidth and capabilities of mobile multimedia broadcast technologies is expected to lead to an expanding user base and an expansion of applications and uses for such systems.

SUMMARY

The various embodiments enable mobile devices to receive information regarding information updates, such as when new programming information is available, in a power-efficient manner utilizing the overhead information service (OIS) that mobile devices must monitor even while in stand-by mode. The various embodiments provide a generic transport mechanism for transmitting upper layer information summary flows in the lower layer sub-channel such that all of the information summary flows can share the same physical layer sub-channel. A small portion of the OIS within a broadcast signal can carry a relatively small amount of data (such as a few bytes) without impacting the system bandwidth. The small amount of data carried in the power-efficient logical channel can be used by receiver devices to determine when they should receive an information flow, access a different part of the broadcast symbol, or take an action in response to a received code. Enabling mobile devices to know when new information is available in an information flow can extend device battery life because mobile devices can remain in the low-power, stand-by mode as long as information in the OIS confirms that the device possesses the latest information flow. Receiver devices must periodically receive the OIS flow to receive the control information needed to receive broadcast content, thus the summary information communicated in the power-efficient logical channel (e.g., information flow version numbers) can be received without consuming additional battery power.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
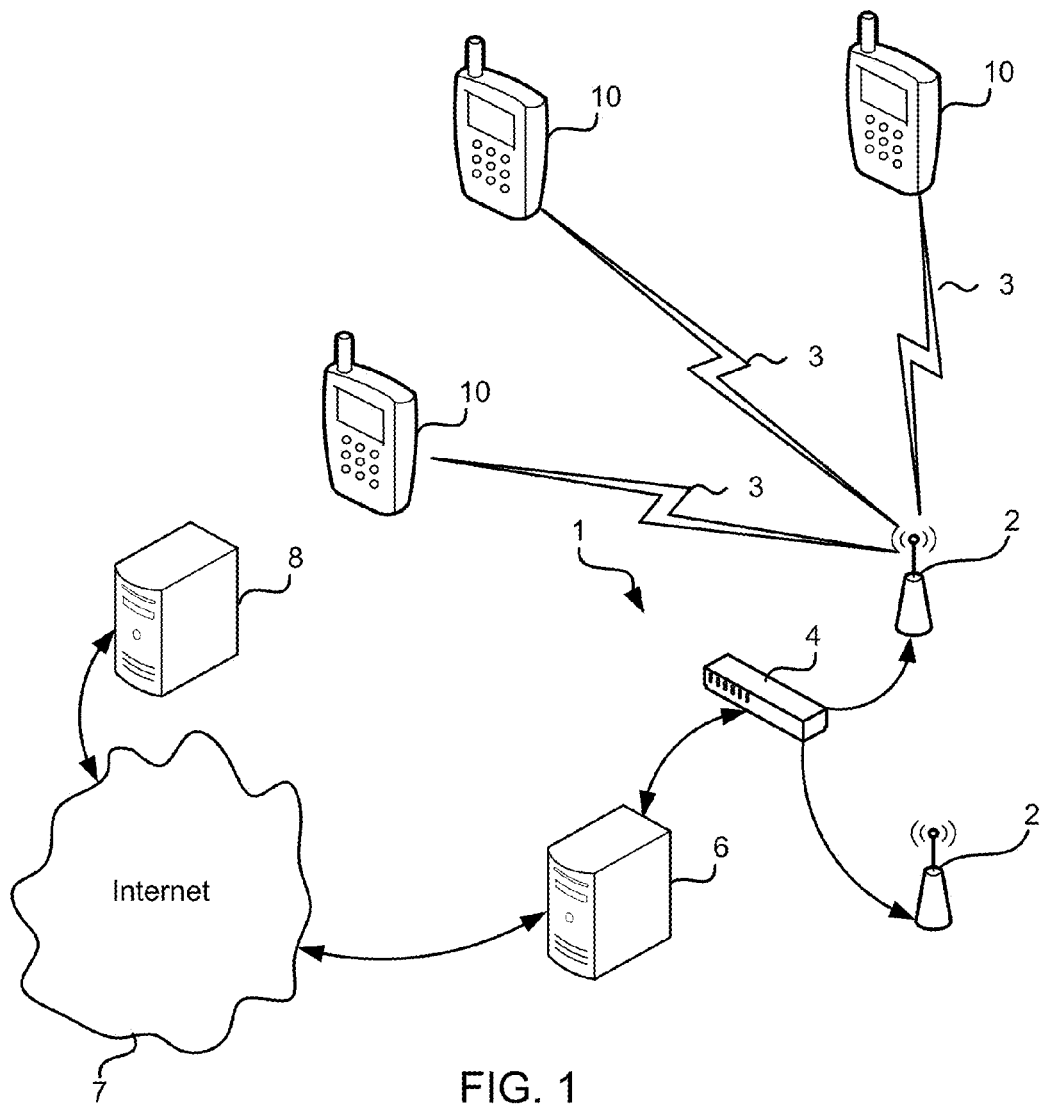
FIG. 1 is a communication system block diagram illustrating a mobile multimedia broadcast communication system suitable for use in an embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device" and "receiver device" are used interchangeably herein to refer to any one or all of cellular telephones, personal data assistants (PDA's), palm-top computers, wireless electronic mail receivers (e.g., the Blackberry® and Treo® devices), multimedia Internet enabled cellular telephones (e.g., the Blackberry Storm®), Global Positioning System (GPS) receivers, wireless gaming controllers, and similar personal electronic devices which include a programmable processor and memory and mobile multimedia broadcast receiver circuitry for receiving and processing mobile multimedia broadcast transmissions.

The word "broadcast" is used herein to mean the transmission of data (information packets) so that it can be received by a large number of receiving devices simultaneously. Examples of a broadcast message are mobile television service broadcast signals, including content broadcasts (content flow) and metadata broadcasts (information flow) such as the Electronic Program Guide (EPG).

Mobile multimedia receiver devices are different from traditional television sets in that the receiver devices are portable. Consequently, mobile devices configured to receive mobile multimedia broadcast services must be self-contained and designed to operate for extended periods of time on battery power. The need to be battery powered presents unique challenges to mobile multimedia broadcast systems. Mobile multimedia broadcast networks broadcast information in formats that enable mobile devices to selectively tune-in to receive desired content and de-energize their broadcast receiver whenever the desired content is not being broadcast. As a result of the data transmission structure, mobile multimedia receiver devices typically activate their receiver circuitry for a small percentage of the time, thereby reducing the amount of power required to receive desired content. Further, information about programs and content are broadcast in advance so that mobile devices can determine just when to tune-in to receive a selected content.

A number of different mobile broadcast television services and broadcast standards are available or contemplated in the future, all of which may implement and benefit from the various embodiments. Such services and standards include Open Mobile Alliance Mobile Broadcast Services Enabler Suite (OMA BCAST), MediaFLO, Digital Video Broadcast IP Datacasting (DVB-IPDC), and China Multimedia Mobile Broadcasting (CMMB). While the broadcast formats and terminology vary among the different mobile multimedia broadcast service standards, they all employ metadata transmissions to enable mobile devices to receive selected content and inform users of programs and content available for viewing or download. To avoid confusion regarding particular broadcast standards, the generic terms "content flow", "information flow", and "metadata messages" are used herein to describe the various embodiments.

Mobile multimedia broadcast services enable mobile devices to be self-contained by broadcasting information about the programs and content that will be broadcast in the future via a portion of broadcast transmissions dedicated to carrying information about content flows (referred to herein as the "information flow" or the "content description flow"), which is separate from the portion of the broadcast transmissions that carry the content (referred to herein as "content flow"). This information about the content, or "metadata," enables mobile devices to discover how and when to receive selected content. Mobile devices can also process this metadata to provide users with an electronic viewing guide. Such an electronic viewing guide, which is known in some mobile multimedia formats as a "media program guide" (MPG), "electronic program guide" (EPG), "service guide," or "electronic service guide" (ESG), is a viewable program guide similar to that available on cable and satellite television systems. The electronic viewing guide provided on mobile multimedia broadcast networks enables users to see what programming and content is available, when, and on what "channel" or flow. The electronic viewing guide may be presented in a graphical user interface format so that users can easily designate a program for viewing or content for download by selecting it within a display of future programs and content. In addition to identifying the start time and broadcast address for particular programs and content, the broadcast metadata may also include information regarding the nature of the content to be broadcast.

A typical mobile multimedia broadcast network transmits content on a plurality of different channels or flows, thereby enabling several different programs to be broadcast simultaneously. Due to the nature of the broadcast transmission waveform, the plurality of different channels or flows may be carried over the same radio frequency spectrum, such as in an orthogonal frequency domain multiplex (OFDM) wave form, including a structure and information that enables each of the channels or flows to be selected and received by receiver devices. Individual channels or flows may be identified by an address or a flow identifier (ID). Information within the content description flow enables receiver devices to determine the particular address or flow ID to access in order to receive a particular content. Each content flow is carried on one or more media logical channels (MLC) of the physical layer with the data provided to upper protocol layers which process the data to access a selected content flow and the information flows.

Typically, a third type of data stream, referred to as the Overhead Information Service (OIS), is provided within a mobile broadcast signal which enables mobile device receivers to receive particular content flows from the broadcast system. The OIS includes a mapping of sub-carriers and time slots to media logical channels (which are commonly referred to as MLCs) so that the receiver devices know the particular time and frequency carrying the information of particular media logic channels.

To provide a power-efficient broadcast system, receiver devices for mobile broadcast services like MediaFLO may be organized in terms of an upper layer protocol that works in conjunction with a physical layer protocol. In the upper layer protocol, particular content or program signals may be referred to as media flows, which the system information can map to particular media logical channels that are known to the physical layer. Information mapping of Media FLO flow ID used in the upper layer protocol to particular media logical channels may be in the information flow broadcast by the mobile multimedia broadcast network. Thus, when a user elects to view a particular program and makes the selection on a user interface, the receiver device uses the information received from the information flow to determine the media logical channel (MLC) to receive and decode.

Media logical channels of the physical layer may be carried on one or more sub-carriers of the broadcast signal on certain time slots. In a broadcast system using orthogonal frequency-division multiplexing (OFDM), such as MediaFLO, the broadcast signal may be divided into a large number of orthogonal sub-carriers. OFDM communication technologies and concept of OFDM sub-carriers is well known in the communication arts.

In order to provide a dynamic and flexible system, broadcasters may dynamically allocate sub-carriers and time slots to media logical channels to provide the necessary bandwidth for particular programs and content. Broadcasters then transmit the information mapping sub-carriers and time slots to media logical channels that are broadcast in the OIS. Since such information is relatively simple and limited, the OIS typically consumes a minimal portion of the broadcast signal. For example, in MediaFLO, the OIS is included within the first approximately 10 milliseconds of each one-second superframe. Since the OIS carries critical information necessary for mobile devices to operate, mobile devices typically obtain and decode the OIS on a frequent basis, such as approximately every forty seconds. Since the OIS is so short, periodically energizing the receiver to receive an OIS signal requires a small amount of power.

The various embodiments provide a generic transport mechanism for transmitting upper layer information summary flow data in a lower layer sub-channel such that a number of information summary flows—even information summary flows for different protocol layers—can share the same physical layer sub-channel. The OIS (Overhead Information Service) channel in the broadcast system (e.g., a Media FLO system) is used to transmit information regarding a version of the control information on the control layer. The receiver device normally periodically wakes up to monitor the OIS to see if there is any update to the control information. In the various embodiments, new fields are added to the OIS to provide a power-efficient logical channel (PLC) for transporting relatively small amounts of information that is provided to upper protocol layers which interprets the information as one or more information summary flows. Information summary flows can carry a relatively small amount of information which can be useful in the operation of a receiver device, such as codes or a version number of an information flow that can be used by upper layer information flow protocols to determine whether new information is available on a particular information flow, to send coded information suitable for delivery messages (e.g., alerts), or information about an information flow (beyond its version number) to enable a receiver device to determine whether the information flow should be accessed. The mapping from an information summary flow to a power-efficient logical channel payload can be specified as part of the control information.

Employing the various embodiments, a receiver device can minimize power consumption because it only needs to periodically wake up (i.e., energize the receiver circuitry) to receive the OIS to determine if there is any update to an information flow. Since receiver devices must monitor the OIS periodically anyway, the receiver devices can be informed of the version of all information flows without expending any additional battery power. In an example embodiment, the receiver device may be configured to periodically wake up to receive the OIS and map the identifier of an information summary flow corresponding to a particular information flow to the power-efficient logical channel identifier based on control information. Using the power-efficient logical channel identifier, the receiver device retrieves the information summary flow data from the received OIS payload. The receiver device may then process the summary data received from the information summary flow to see if there has been any update in the information flow, or receive other information about the summary flow or alert codes. If the information in the information summary flow indicates that the information flow has been updated, the receiver device may activate the receiver to receive the updated information flow. The various embodiments may be extended to include broadcasting codes or other brief information that can be utilized by applications or to communicate information to all receiver devices, such as emergency alert messages. Further, in some implementations, sufficient information may be carried in the information summary flow to enable the receiver device to determine whether to access the information flow based on aspects other than just its version number. Since receiver devices monitor the OIS on a relatively frequent basis (e.g., every 40 seconds), such codes can be delivered within a relatively short amount of time compared to transmitting the information in an information flow.

Information about content that will be broadcast, which is referred to herein as "content description flow messages," "Content Description Flow" or "CDF," may be transmitted in an information flow ("IF" in the figures). The information flow is a relatively low data rate portion of the mobile multimedia broadcast signal suitable for carrying overhead information like the program and content metadata (e.g., broadcast time and flow number). In contrast to the information flow, programs and content are broadcast via high data rate portions of the broadcast signal, which are collectively referred to herein as the "content flow."

Example components of a typical mobile multimedia broadcast system are illustrated in FIG. 1. A mobile multimedia broadcast network 1 typically includes a plurality of broadcast transmitters 2 controlled by a mobile broadcast network control center 4. The mobile multimedia broadcast network 1 broadcasts content from the broadcast transmitters 2 as mobile broadcast transmissions 3 for reception by mobile devices 10. Within the mobile broadcast network control center 4 will typically be one or more servers 6 which may be configured to manage the scheduling of content broadcasts, generation of electronic service guides and other metadata regarding the content broadcasts, and generation of metadata messages for broadcast via the information flow of the mobile multimedia broadcast network 1. One or more servers 6 may also include connections to an external network, such as the Internet 7, through which the server 6 may receive content feeds and other data (e.g., public safety announcements from a governmental emergency services agency) from content provider servers 8. One or more servers 6 may determine a schedule for broadcast of the content in content batches, generate an information flow including metadata regarding the content (e.g., broadcast times and flow numbers), assign a version number to the information flow, and provide the information flow data to the mobile multimedia broadcast network 1 for inclusion within the broadcast signal that is transmitted for reception by mobile receiver devices 10.

The information flow included in broadcast signals informs receiver devices when each program or content will be transmitted and the broadcast address (e.g., flow or channel number) on which each flow of content may be received. Receiver devices can use the information in the information flows to determine if any of the content has been selected by the user for reception or download and, if so, determine the time to tune-in to the broadcast transmissions and the network address on which to receive the selected content.

Figure 2:
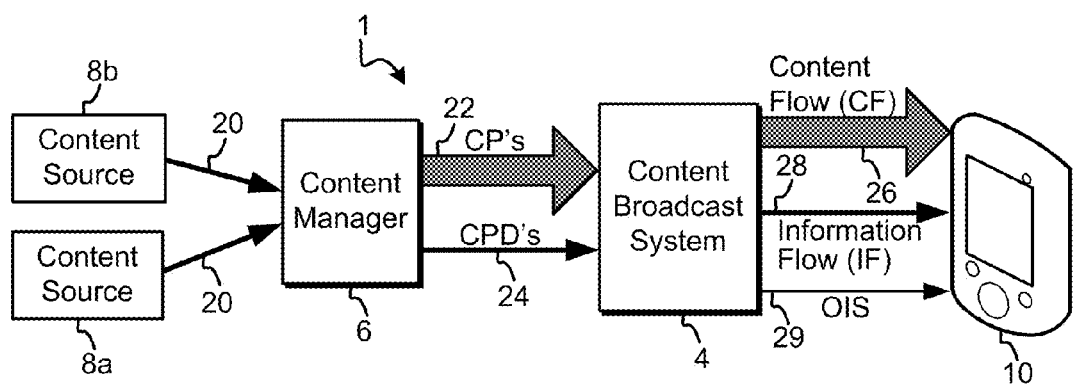
FIG. 2 is an alternative representation of a communication system block diagram of a mobile multimedia broadcast system.

FIG. 2 illustrates the generation and transmission of signals within a mobile multimedia broadcast network 1. As mentioned above, a mobile multimedia broadcast network 1 may receive content (e.g., television programs websites, serial data feeds, etc.) from a number of content sources 8*a*, 8*b*. Such content may be provided to a content manager server 6 within a mobile multimedia broadcast network 1 via data networks 20 (e.g., the Internet 7). The content manager server 6 may store such content in a database and scheduled the content for broadcast. In scheduling content for broadcast, the content manager server 6 determines what will be broadcast when and on which broadcast stream (e.g., flow or channel number). As part of scheduling, the content manager server 6 may format the content into content packages (CPs). The content manager server 6 can also determine information about the content, such as a title of the information, its source (e.g., an Internet address, URL or producer), the nature of the information (e.g., sports, news, finance, etc.), its age or date/time of creation, and other information about the content that may be useful for selecting content matching user preferences.

The content manager server 6 may combine the scheduled broadcast time and address with the other information regarding the content (such as the associated media logical channels for each content flow) to generate content packet descriptions (CPDs) which will be broadcast in one or more information flows. When content is scheduled for broadcast, the content manager server 6 may provide the content packages to the content broadcast system 4 in an internal network dataflow 22, along with the content package descriptions in an internal network dataflow 24. These data flows are then processed by the content broadcast system 4 into a multiplex broadcast waveform which are broadcast live by the network transmitters 2 as broadcast transmissions.

In order to fit the broadcast content with bandwidth available, the broadcast system allocates various content flows into one or more media logical channels which are defined in the multiplex to broadcast signal. In order to enable receiver devices to determine the media logical channels corresponding to particular content flow numbers, the broadcast signal also includes an overhead information service (OIS) flow of data which provides receiver devices with the control information required to receive the broadcast content. The content flow, information flow and OIS are encoded within the multiplex broadcast signal. Thus, the broadcast transmissions may include several different content flows (CF) 26 which are data packets carrying the broadcast content, one or more information flows (IF) 28 which include data packets carrying the content packet descriptions, and the OIS flow 29 which provides information that the receiver device needs to receive the content and information flows 26, 28. Receiver devices 10 receive the broadcast transmissions and are able to separately process content flow 26 and the content description flow 28 using the information provided in the OIS 29.

Figure 3:
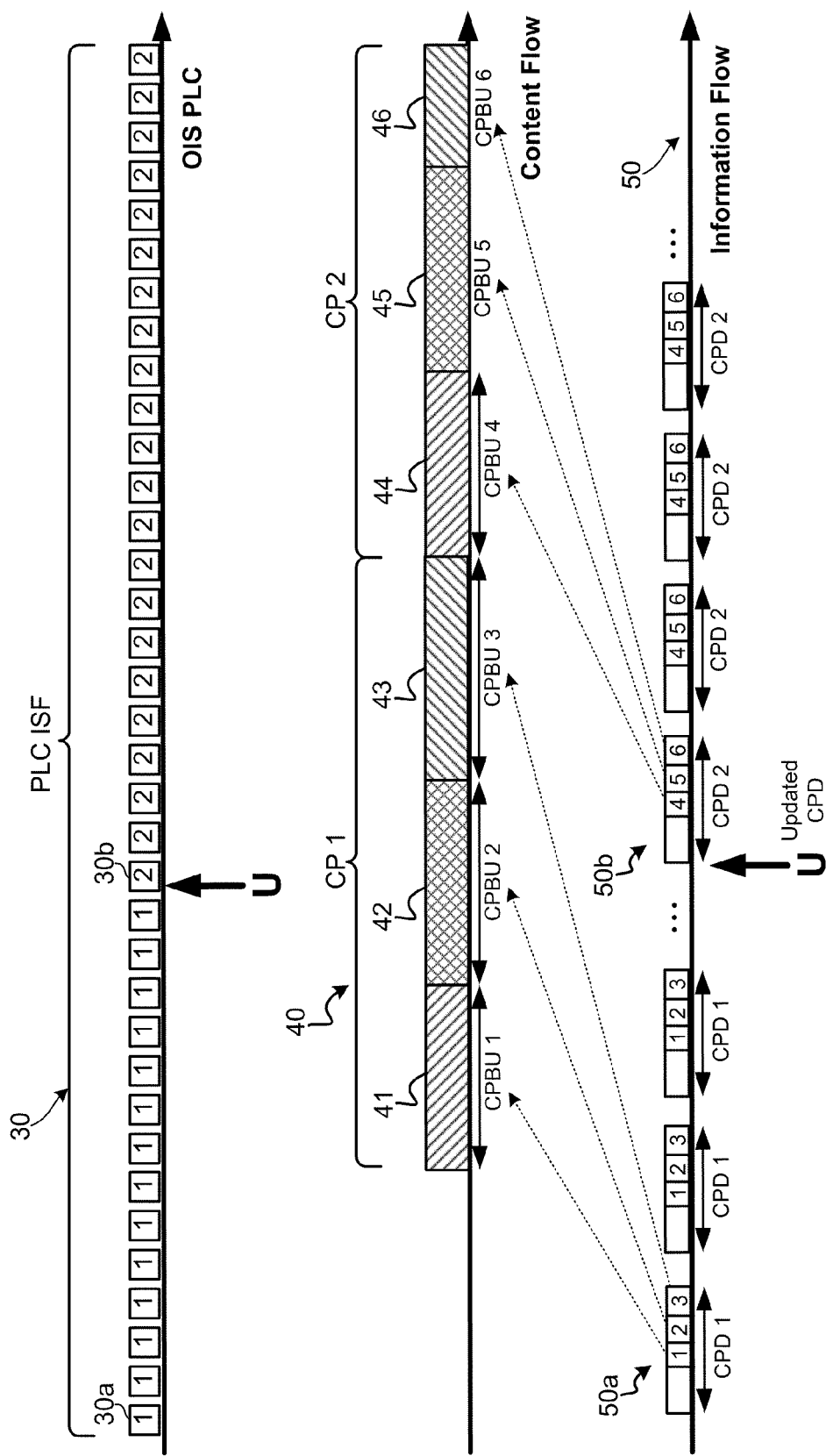
FIG. 3 is a communication flow schematic illustrating how content packages may be organized for broadcast in a mobile multimedia broadcast system.

A mobile multimedia broadcast system may broadcast content in the form of content packages (CP) 40 as illustrated in FIG. 3. Content packages 40 may be broadcast on any of the number of the content flows within the broadcast transmission. While FIG. 3 illustrates a single content flow, a typical broadcast system will simultaneously broadcast a number of content flows. A particular content package may be made up of a group of content package broadcast units (e.g., CPBU 1-3) that are related to multiple programs, documents or sources. For example, a content package 40 may be an assembly of webpages, a video clip, or a text list. A content element may be a particular portion of the content within a content package broadcast unit, such as an HTML page, an image or icon or a flash component. It should be appreciated that FIG. 3 is provided for illustration purposes only and is not intended to limit the manner in which content data is encoded into packets which will depend upon the type of mobile multimedia broadcast technology that is implemented.

An information flow 50 may also be broadcast to inform receiver devices of the broadcast content packages to enable receiver devices to determine whether any content match user preference selections. The information flow 50 may include descriptions of the contents which are referred to as content package descriptions 50a, 50b. The information flow 50 may include a version number so that receiver devices can determine whether the content package descriptions 50a, 50b in the broadcast stream are new (i.e., updated) or a broadcast content package description that has already been received and processed. Such information is valuable since the content package descriptions in information flows are broadcast repeatedly in the time leading up to broadcast of the corresponding content packages. A broadcast system may periodically update and information flow 50, such as to reflect a change in the broadcast schedule or reflect the next day's broadcast schedule. As illustrated on FIG. 3, an update of the information flow will typically be scheduled to occur sufficiently in advance of the corresponding broadcast content so that receiver devices can receive the information.

The various embodiments enable power efficient operation of receiver devices by including information characterizing the information flow, such as a version number, within power-efficient logical channels 30 included in the OIS flow. In the example illustrated in FIG. 3, the version number of the information flow 50 is included in the power-efficient logical channel information summary flow 30 so that receiver devices are informed that when the information flow has been updated by the change in version number as indicated at a point U.

Figure 4A:
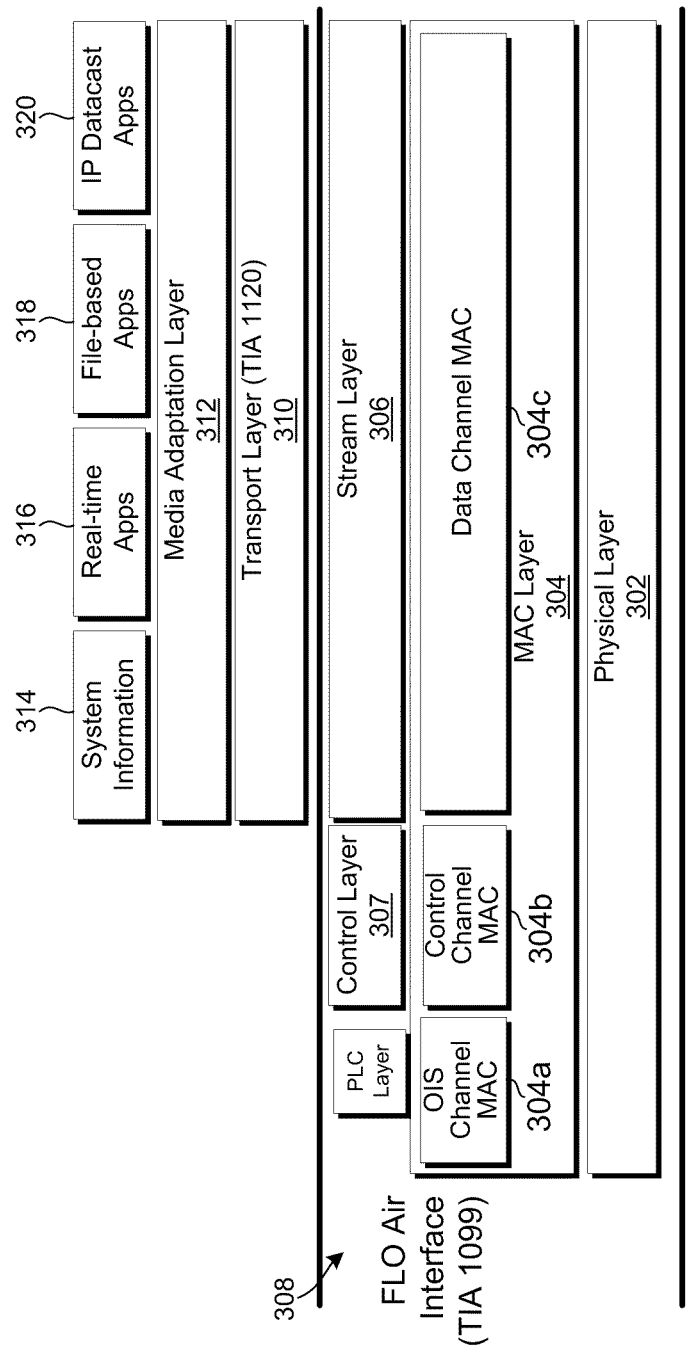
FIGS. 4A and 4B are communication and software protocol stack architecture diagrams illustrating how the various hardware and software protocol modules interact in a receiver device according to an embodiment.

FIG. 4A is a protocol stack diagram illustrating the interactions of the various hardware and software protocol modules within a mobile broadcast receiver using a Media FLO receiver as an example. A Media FLO receiver will include a FLO air interface 308 which includes hardware and software modules defined by the Telecommunication Industry Association specification TIA 1099. The FLO air interface includes a physical layer 302 of radio components that receive the basic signal and provide the received data to a media access control layer (MAC layer) data communication protocol sub-layer 304. The MAC layer provides addressing and channel access control mechanisms that make it possible for various components of the receiver to receive the different stream of data encoded in the broadcast signal. The MAC layer may be implemented in hardware, in software, or in a combination of hardware and software which may be referred to as a medium access controller. The MAC layer may include an OIS Channel MAC 304a, a Control Channel MAC 304b, and a Data Channel MAC 304c.

The portions of the broadcast signal carrying the content and information flows may be passed by the MAC layer 304 to a stream layer 306 which is the data interface to the transport layer 310 (which is defined by TIA 1120) in the receiver device. The FLO air interface 308 may also include a control layer 307 for controlling the various operations of the air interface. Broadcast data received in the transport layer 310 may be processed by a media adaptation layer 312 which functions to deliver data packets to the appropriate upper layer modules which can make use of the data, such as the system information module 314, real-time applications 316, file-based applications 318, and IP data cast applications 320.

As described above with reference to FIG. 3, mobile broadcast signals include information in regarding future broadcast content, referred to as the information flow (IF) is included in the broadcast signal. The information flow (which may also be referred to as a metadata flow) indicates the broadcast schedule on each content flow (i.e., what program or content will be broadcast on what flow at what time). As discussed above, information flow packets are broadcast repeatedly but change infrequently.

Since the information flow changes infrequently, receiver devices can be configured to periodically wake up to receive the information flow and compare it to previously received information. If the information flow has been updated, the receiver device can use the new information flow to facilitate the reception of content, such as updating the media program guide or otherwise controlling reception of desired content. While this system works well, it can unnecessarily limit battery life since the receiver device must periodically energize the radio receiver circuitry long enough to receive the information flow, even when there has not been an update in that information. Further, the receiver device must frequently wake up the radio receiver to receive the information flow, since the monitoring periodicity determines the minimum time between updates to the information flow and implementation of a corresponding change to the content flow.

In the various embodiments, the broadcast signal may include an additional information summary flow (ISF) which includes information which may be use to communicate whether there has been an update in the information flow and/or information regarding the nature of the update, as well as other information (e.g., alert codes or information about content). In an embodiment, an information summary flow includes a version number of the information flow that is currently being broadcast. Since the version number is a relatively small amount of information (e.g., two bytes of information), it can be received in less time than the complete information flow, requiring less receiver power to determine whether the information flow has been updated. By receiving the information summary flow, the receiver device does not have to energized the radio receiver circuitry long enough to receive the entire information flow until there has been an update, as illustrated at point U in FIG. 3. Instead, the receiver device may energize the radio receiver circuitry only long enough to receive the information summary flow from the power-efficient logical channels in the OIS and compare the included version number to the version number of the information flow that has already been received. This approach can save device battery power because the data rate of the information summary flow is much lower than that of the information flow.

However, receiving and processing information summary flows would not power efficient if multiple protocol layers in the broadcast system have their own information summary flows, and the system maps the information summary flows to different physical layer channels. Multiple information summary flows may be required when the mobile broadcast system broadcasts many kinds of information (e.g., application data, Internet protocol data, news and information, etc.) beyond normal television-type broadcast content. For example, in the current Media FLO system, the information summary flow for the control information on the control layer is transmitted in the OIS physical layer sub-channel and the information summary flow for the upper layer information (e.g., notifications, media program guide, etc.) is transmitted in a different physical layer sub-channel. This implementation is not power efficient because receiver devices need to wake up at different times to receive the multiple physical layer channels corresponding to all of the different information summary flows that need to be received by the receiver device.

To improve the energy efficiency of receiver devices, the various embodiments provide a generic transport mechanism for transmitting upper layer information summary flows in lower layer sub-channels as a portion of the OIS channel. Further, by including the transport mechanism within the OIS channel, which the receiver devices must monitor periodically anyway to determine whether there is any change in the control information, all of the information summary flows can be delivered without requiring additional activations of the receiver during standby operation. Thus, all of the information summary flows of various protocols can be delivered "for free," i.e., without imposing additional drain on the device battery. To accomplish this, new fields are added to the OIS payload to provide power-efficient logical channels (PLC) for transporting information summary flow data for various upper layer information flows. The mapping from an information summary flow to the particular power-efficient logical channel carrying that information can be specified as part of the control information. With this enhancement, the receiver device can minimize power consumption because it needs to periodically wake up to receive the OIS anyway (such as approximately every 40 seconds), and the power-efficient logical channels are received as part of the OIS payload. Thus, using power-efficient logical channels to broadcast information summary flows maximizes power saving. Also, because the OIS is received more frequently than information flows have been accessed in prior systems (e.g., every five to six minutes), the various embodiments also promptly informing receiver devices of changes in the information flow or for delivering alerts and notifications.

Figure 4B:
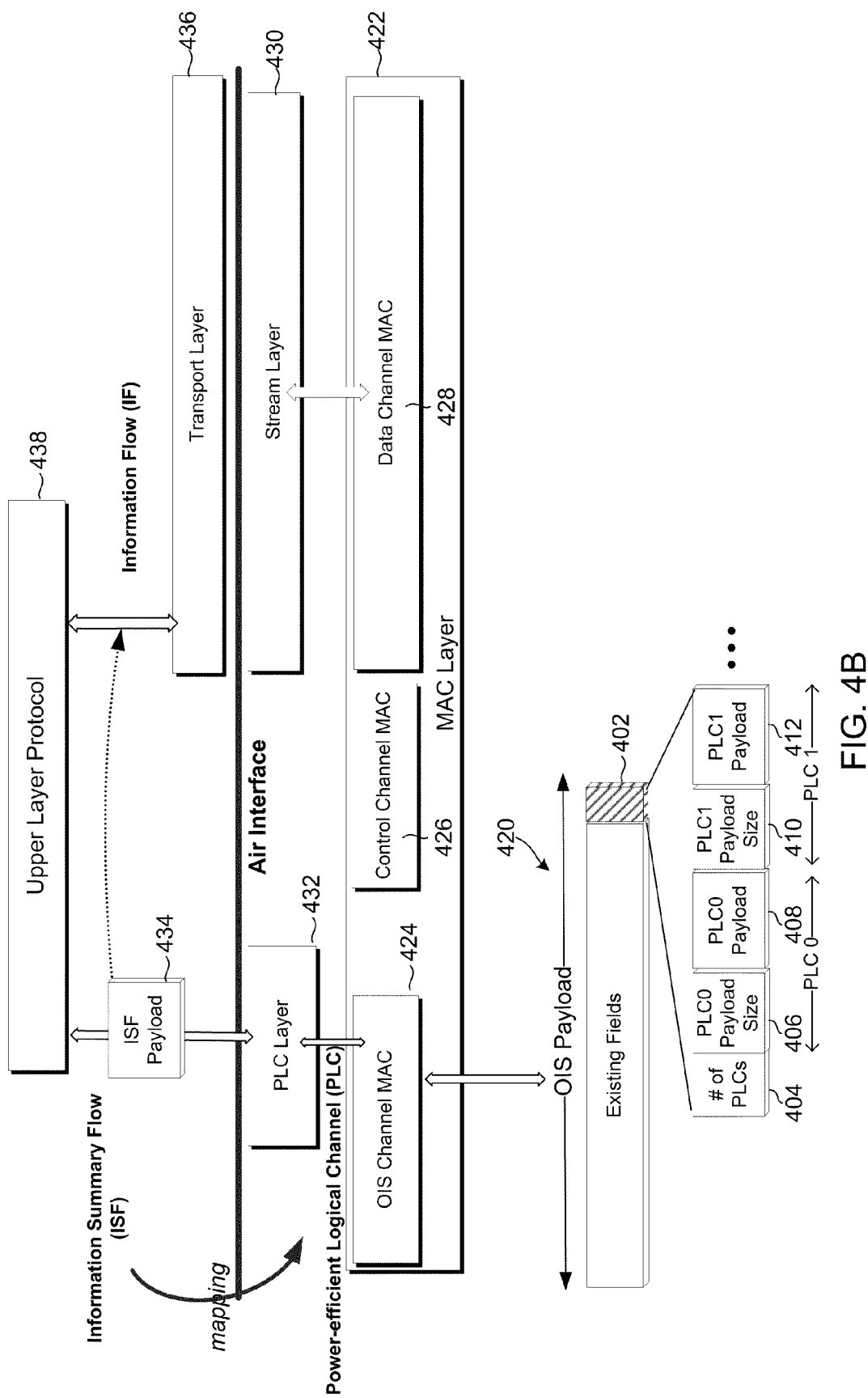

FIG. 4B illustrates an example organization of a receiver device and its interaction with a multiplex to broadcast signal according to an embodiment. As mentioned above, the power-efficient logical channel (PLC) segments 402 are communicated within a small portion of the OIS payload 420. The power-efficient logical channel segment 402 corresponds to power-efficient logical channels (PLCs). The power-efficient logical channel segment 402 may be small because a version number (and similar summary information and codes) can be delivered in a small number of bytes. In an example, the power-efficient logical channel segment 402 may include a few bytes of data, such as a number of PLC payloads field 404 that indicate the number of PLCs (e.g., PLC0, PLC1, etc.) that are included in the channel, and each PLC may include a payload size field 406, 410 and a PLC payload field 408, 412, with the payload size field 406, 410 indicating the number of bits in the subsequent PLC payload. With this information, a receiver module can easily parse the power-efficient logical channel segment 402 into separate PLCs, each providing a different data. Also, the flexible nature of this communication structure enables the OIS to carry any number of PLCs, thereby enabling the system to provide information summary flows for any number of separate protocol layers.

The OIS payload is received separate from the rest of the multiplexed broadcast signal in the transport layer of a receiver device to save power. More particularly, the OIS payload 420 may be processed by an OIS channel media access controller 424 within the MAC layer 422. The MAC layer 304 may also include a control channel media access controller 426 and a data channel media access controller 428 which provides the received broadcast information to the stream layer 430. The control channel media access controller 426 can use control information to map the power-efficient logical channel payloads to particular information flows. The stream layer 430 provides broadcast content and information flows to the transport layer 436 which provides data to the upper layer protocols, including information flows (IF) to the upper layer protocol 438.

The OIS channel media access controller 424 may provide the PLC payloads 408, 412 to a PLC layer module 432 which maps each PLC payload 408, 412 to a particular information summary flow associated with a particular upper layer protocol. The PLC layer module 432 may then provide each PLC payload 408, 412 to a respective PLC payload layer 434, which provides the information within the payload to the appropriate upper layer protocol 438 which obtains the information summary flows (e.g., an information flow version number).

In one implementation, the upper layer protocol 438 can use the information summary data from the information summary flow ("ISF" in the figures) payload to determine whether an information flow has been updated. If the upper layer protocol 438 determines that the information flow version number in the information summary flow payload is the same as the version number of the last received information flow, the receiver can remain de-energized, because there is no need to receive the information flow. However, if the upper layer protocol 438 determines that the information flow version number in the information summary flow payload is different from the version number of the last received information flow, the protocol can request the transport layer 436 to receive the information flow. In that case, the transport layer may direct the air interface to energize the receiver (i.e., the physical layer 302) and receive the information flow, which is then provided via the data channel MAC 428 and stream layer 430 to transport layer 436, which provides the information flow to the upper layer protocol 438. As part of receiving the information flow, the upper layer protocol 438 may store the information flow version number in memory so the value can be compared to future PLC-provided information summary flows.

While FIG. 4B shows a single upper layer protocol 438, the same basic architecture may be implemented with multiple upper layer protocols.

The architecture illustrated in FIG. 4B enables information summary flow version numbers and other abbreviated or summary information to be delivered to a variety of upper layer protocols without causing a layer violation. In overview, the physical layer simply passes the portion of the OIS containing the power-efficient logical channels to an address or register accessible by an upper layer protocol without having to process the information or determine the nature of the information.

Figure 5:
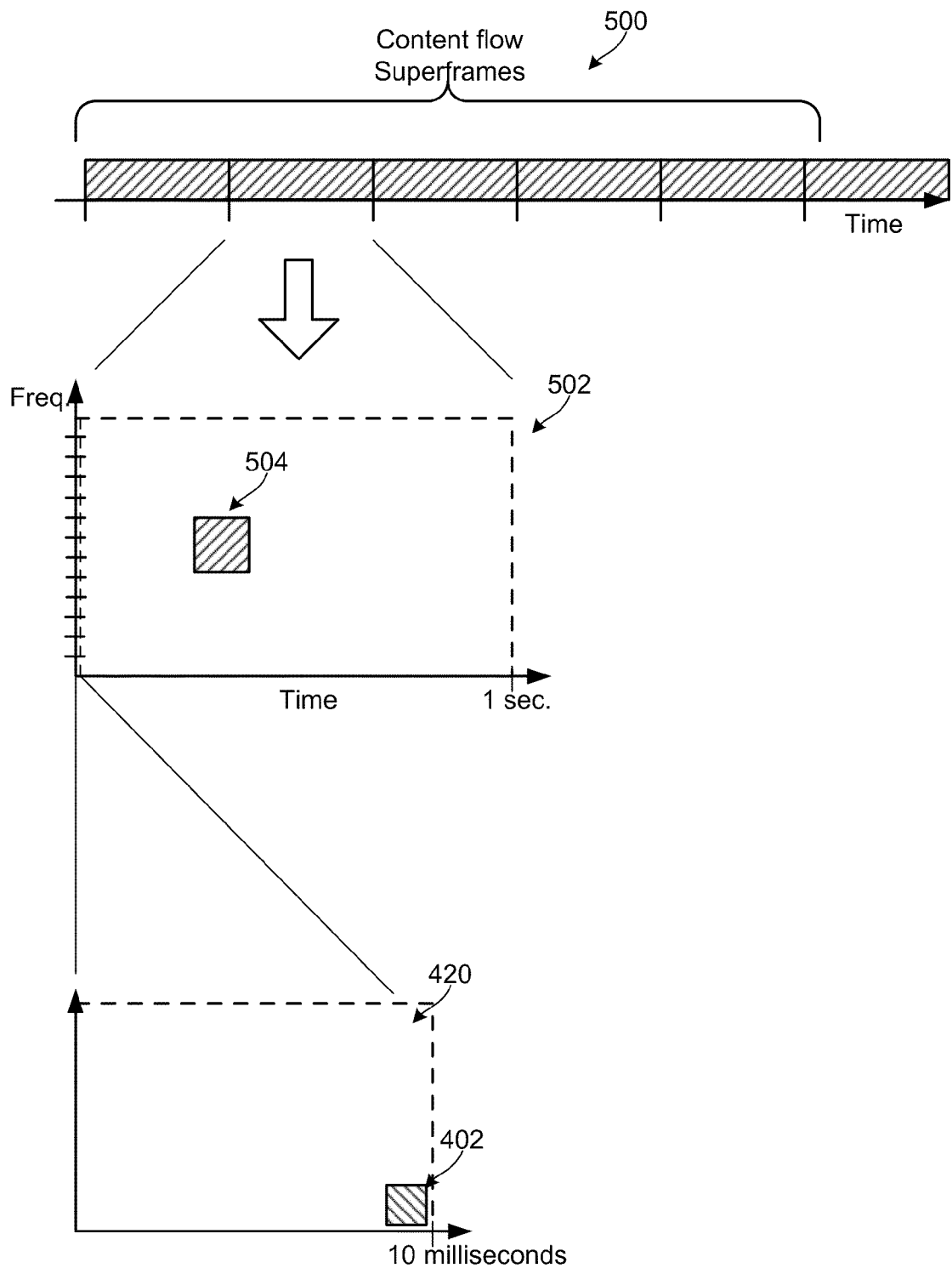
FIG. 5 is diagram of a broadcast datastream transmitted in OFDM format illustrating the Overhead Information Service (OIS) flow including a power-efficient logical channel (PLC).

Since the size of the summary information communicated in the power-efficient logical channels can be very limited, such as a matter of a few bytes, it can be communicated in a small fraction of the OIS flow. This is illustrated in FIG. 5 which illustrates how power-efficient logical channels 402 can fit within an OFDM multiplexed broadcast signal without significantly reducing the bandwidth of the system. In a typical mobile broadcast system, the various content flows, information flows and overhead information (e.g., OIS flow) are transmitted in a series of super frames 500. For example, in the Media FLO system each superframe 502 is 1 second long. Each sub-channel 504 carrying at least portion of an information flow or content flow is carried within a portion of the OFDM signal defined in terms of frequency and time. Information regarding the location within the subframe of a subchannel 504 is provided within the OIS, which is typically broadcast as the first few milliseconds of each superframe. For example, in the Media FLO system, the first approximately 10 milliseconds of each superframe carries the OIS information. The receiver device MAC layer 422 uses the information in the OIS to determine the location within the superframe 502 of each logical channel 504.

Just as the OIS is a small fraction of each superframe, the power-efficient logical channels can be provided in a very small fraction of the OIS. For example, to provide a single information summary flow, the version number could be communicated in as few as two bytes of information. However, the embodiments are not limited to such small amounts of information, and the information summary flow provided in the PLC may carry more information, including alerts and information about content flow sufficient to enable a receiver device to determine whether an content flow should be accessed based upon user settings and preferences.

While the information provided in the power-efficient logical channels may be limited, such summary information provided in the corresponding information summary flows may be leveraged for a number of useful applications. For example, the information can be used to inform the receiver device when the information flow providing program content information is updated so that the receiver device may only receive the information flow when it has been changed from a version stored in memory. In another example, multiple information flows, such as to support multiple types of information content that may be received from the broadcast signal, may be monitored without requiring the receiver device to expend more battery power. As a further example, other types of information, such as emergency alerts, system alerts and other application notifications, may be communicated so the information is received promptly (e.g., within approximately 40 seconds) without requiring the receiver device to expend additional battery power. Thus, emergency alert messages may be delivered to receiver devices without impacting their battery life. In yet a further example, the information summary flow may carrying other types of information, such as information about content flows that would enable a receiver device to determine whether a content may be of interest to a user of the receiver device (e.g., based on user settings and preferences) so that the content flow may be accessed to obtain more information (e.g., broadcast time, title, and flow ID).

Figure 6:
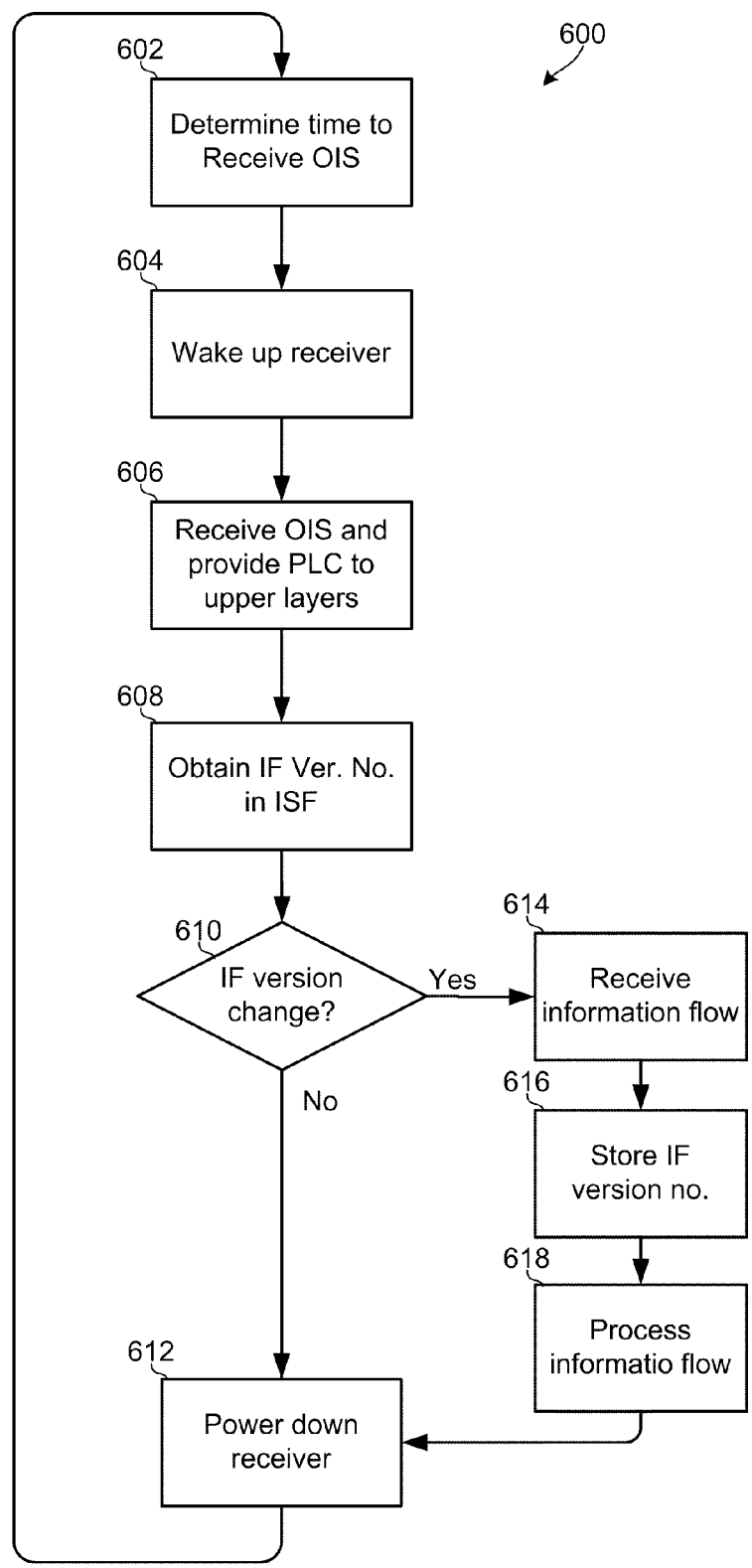
FIG. 6 is a process flow diagram of an embodiment method for receiving an information flow version number in the PLC.

An embodiment method 600 which may be implemented in a receiver device for receiving and using information in power-efficient logical channels as illustrated in FIG. 6. Method 600 may be used in implementations in which the power-efficient logical channels are used to enable receiver devices to determine when a single overhead flow is updated. In method 600 at block 602, the receiver device may determine when it is time to check the OIS. As mentioned above, the OIS is received periodically, such as every 40 seconds, so that the receiver device is informed of changes in the format of the broadcast symbols. When it is time to receive the OIS, at block 604, the receiver device may wake up the receiver (i.e., apply power to the receiver circuits), and receive the OIS portion of the next superframe at block 606. At block 608, the receiving device may obtain the information flow version number that is contained in the power-efficient logical channels contained within the received OIS. At determination block 610, the receiving device may determine whether the information flow version number has changed by comparing the newly received information flow version number to the version number stored in memory of the last information flow received. If the information flow version has not changed (i.e., determination block 610="No"), the receiver device may power down the receiver at block 612 to conserve battery power, and begin the countdown to the next time the OIS should be received by returning to block 602.

If the information flow version has changed (i.e., determination block 610="Yes"), the receiver device may direct the transport layer to receive and decode the information flow at block 614. In this process, the receiver processes the OIS in a conventional manner. At block 616, the receiving device may store the version number of the newly received information flow, and process the newly received information flow in a conventional manner at block 618.

Figure 7:
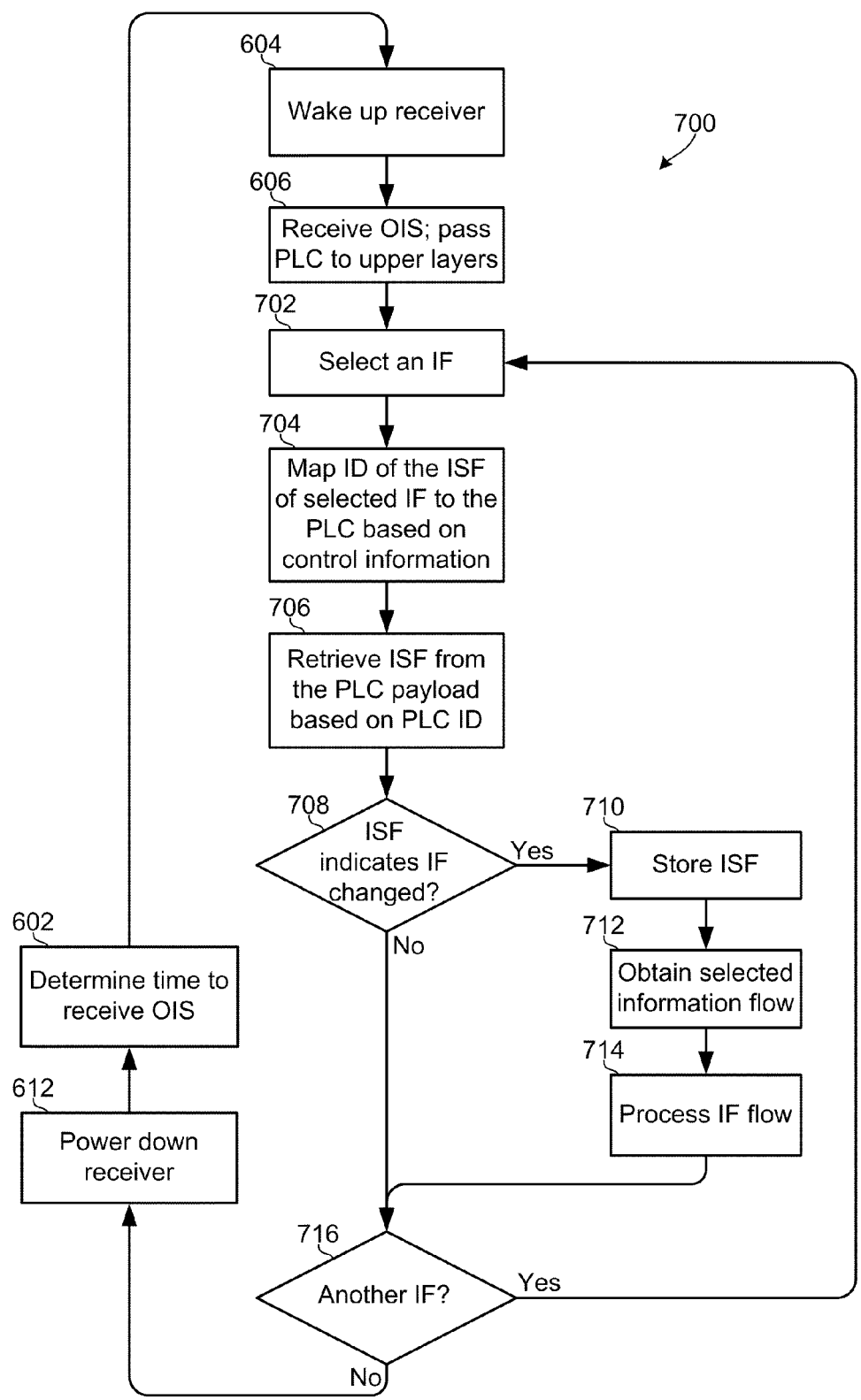
FIG. 7 is a process flow diagram of an embodiment method for receiving versions numbers for a plurality of information flows in the PLC.

Another embodiment method 700 that may be implemented within a receiver device for receiving and using information in a plurality of power-efficient logical channels supporting a plurality of information summary flows is illustrated in FIG. 7. Method 700 may be used in implementations in which multiple information flows are provided to multiple upper layer communication protocols. In method 700 at block 602, the receiver device may determine when it is time to check the OIS. When it is time to receive the OIS, at block 604, the receiver device may wake up the receiver (i.e., apply power to the receiver circuits), and receive the OIS portion of the next superframe at block 606. At block 702, the receiver device may select a particular information flow, and at block 704 map the identifier of the information summary flow for the selected information flow to a particular power-efficient logical channel based on control information. At block 706, the receiving device may retrieve the particular information summary flow from the power-efficient logical channel payload using the mapped PLC identifier. At determination block 708, the receiving device may determine whether the selected information summary flow has changed. This determination may involve comparing a version number within the information summary flow to a version number for the selected information flow stored in memory. If the newly received version number indicates that the information flow has not changed since the last time it was received (i.e., determination block 708="No"), the receiver device may determine whether there is another information summary flow that should be evaluated at determination block 716. If the information summary flows for all information flows have been evaluated (i.e., determination block 716="No"), the receiver device may power down the receiver at block 612 to conserve battery power, and begin the countdown to the next time the OIS should be received by returning to block 602. If there is another information summary flow to be evaluated (i.e., determination block 716="Yes"), the receiver device may return to block 702 to select the next information summary flow.

If the newly received version number indicates that the selected information summary flow has changed since the last time it was received (i.e., determination block 708="Yes"), the receiver device may store the information summary flow or version number of the selected information flow in memory at block 710. At block 712, the receiving device may receive the selected information flow, and process the information flow at block 714. The processing applied to a received information flow will depend upon the particular protocol receiving the information flow. For example, if the information flow is providing broadcast program information, the corresponding upper level protocol may update or generate a media program guide. If the information flow is providing information regarding downloadable content, the corresponding upper level protocol may determine whether any to-be-broadcast content is of interest to the user and schedule a reception of content if appropriate.

After obtaining and processing the selected information flow, the receiver device may determine whether there is another information summary flow that should be evaluated at determination block 716. If all information summary flows for all information flows have been evaluated (i.e., determination block 716="No"), the receiver device may power down the receiver 612 to conserve battery power and begin the countdown to the next time the OIS should be received by returning to block 602. If there is another information summary flow to be evaluated (i.e., determination block 716="Yes"), the receiver device may return to block 702 to select the next information flow.

Figure 8:
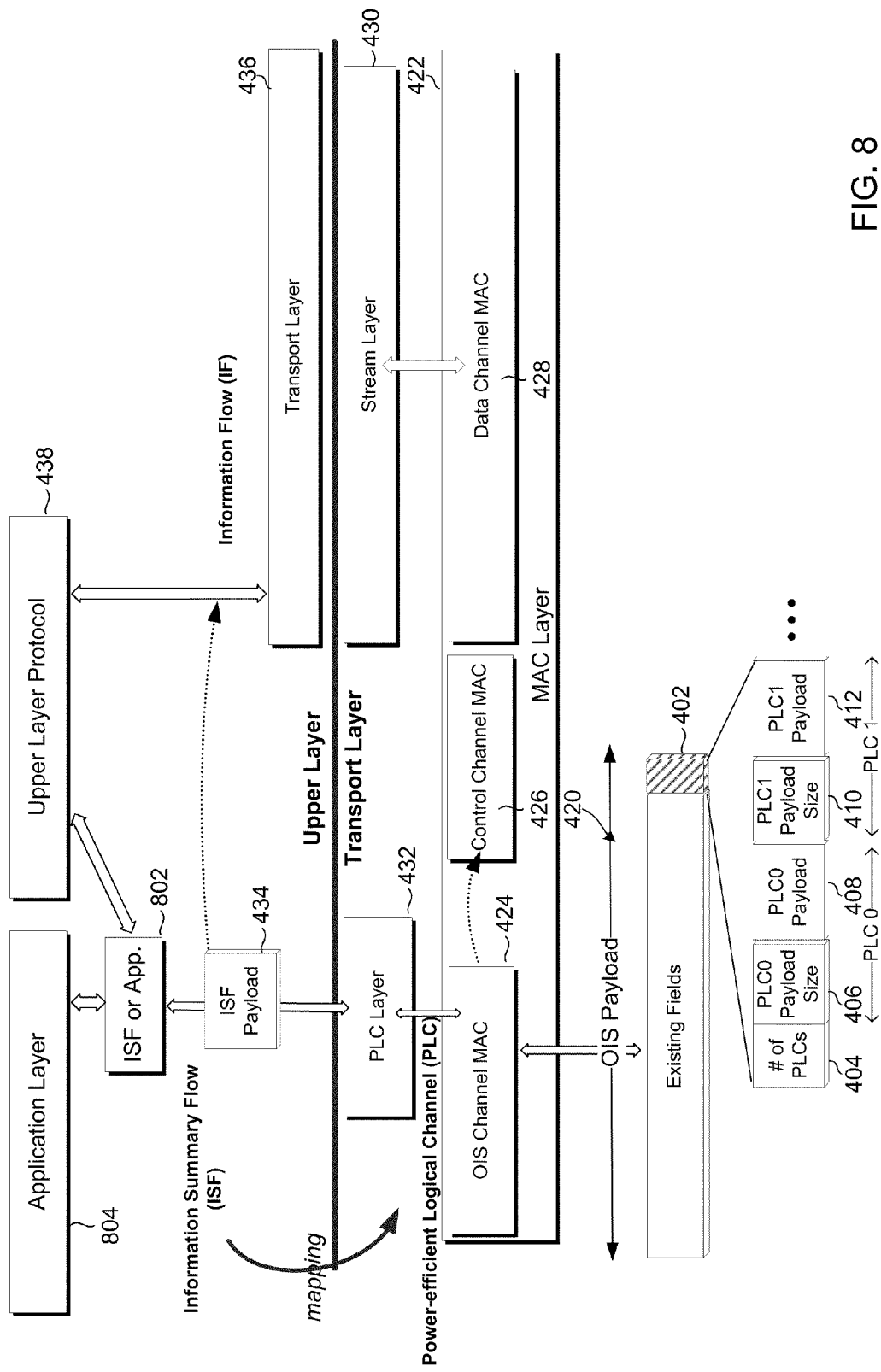
FIG. 8 is a communication and software system architecture diagram according to another embodiment.

As mentioned above, the summary information channel provided by the power-efficient logical channel capability can be used for other applications besides just notifying receiver devices of updates to information flows. FIG. 8 illustrates a communication and software protocol diagram of an embodiment which can communicate information to applications as well as communication protocols. The organization of protocols and the communication of data is similar to that illustrated in FIG. 4B, and descriptions of like numbered elements shown in that figure apply to FIG. 8 as well. In addition to the elements described above with reference to FIG. 4B, a receiver device may be configured with a software module 802 to distinguish whether a PLC payload 434 is intended for an information summary flow or as data input to an application. If the PLC payload is for an upper layer information summary flow protocol 438, the ISF/application module 802 may direct the data received in the PLC payload to the corresponding upper layer ISF protocol 438. If the PLC payload is for an application, the ISF/application module 802 may direct the data received in the PLC payload to the corresponding application in an application layer 804. In this manner, the power-efficient logical channels can be used to pass messages to applications on receiver devices, such as emergency warning notifications.

Figure 9:
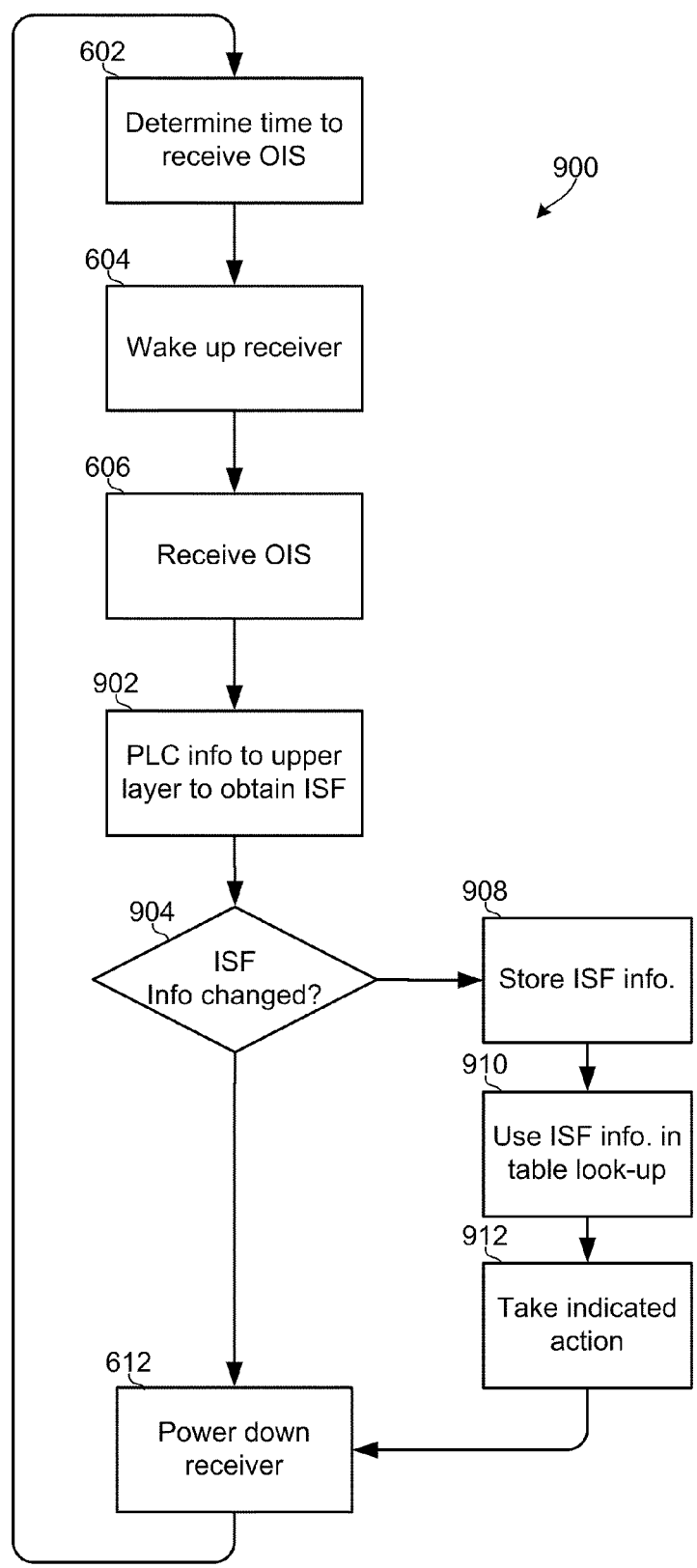
FIG. 9 is a process flow diagram of an embodiment method for receiving alerts and other types of application information in the PLC.

FIG. 9 illustrates an embodiment method 900 for processing data communicated in the power-efficient logical channels for use in activating a number of functions or applications in mobile receiver devices. Since the size of the power-efficient logical channels is very limited, a message or function code may be transmitted which can be used by receiver devices in a table lookup function to determine the actions that should be taken by the receiver device or otherwise determine the full contents of information being communicated. Receiver devices can be configured with a data table that correlates codes, such as each of the values of one byte of data, to specific functions that should be implemented and/or messages that should be displayed. For example, by transmitting a single byte of data within the power-efficient logical channels, mobile devices may be directed to implement up to 256 different functions or information displays.

Referring to FIG. 9, in method 900 at block 602, the receiver device may determine when it is time to check the OIS. When it is time to receive the OIS, at block 604, the receiver device may wake up the receiver, and receive the OIS portion of the next superframe at block 606. At block 902, the receiving device obtains the data communicated in the power-efficient logical channels. At determination block 904, the receiving device may determine whether the data communicated in the information summary flows mapped to the power-efficient logical channels has changed (which would indicate that a new message is being communicated) by comparing the newly received information summary flowdata to the information summary flowdata that was stored in memory the last time that the receiver device took action on the information summary flow data. If the information summary flow data has not changed (i.e., determination block 904="No"), the receiver device may power down the receiver at block 612 to conserve battery power and begin the countdown to the next time the OIS should be received by returning to block 602.

If the information summary flow data has changed (i.e., determination block 904="Yes"), the receiver device may store the data received from the information summary flow in memory at block 908. At block 910, the receiver device may use the information summary flow data received from the power-efficient logical channel to perform a table lookup using a data table of predefined functions and messages to be implemented based upon a code received in the information summary flow data. At block 912, the receiving device may implement the predetermined function or display the message that corresponds to the data or code received in the information summary flow. Thereafter, the receiver device may power down the receiver at block 612 to conserve battery power and begin the countdown to the next time the OIS should be received by returning to block 602.

The capability of broadcasting alert codes that can be linked to a variety of messages which can be displayed on receiver devices may have a number of useful public safety applications. For example, public alert messages may be transmitted to all mobile receiver devices which can be configured with an alert message data table to present the appropriate alert to users even when the device is in standby mode. Since the power-efficient logical channel portion of the OIS represents an extremely small amount of data, receiver devices can be configured to monitor the power-efficient logical channel frequently (e.g., every few seconds) to enable timely delivery of urgent public safety messages. For example, some public safety alert messages are extremely time-critical, such as earthquake or tsunami warnings. By including the alert code within a power-efficient logical channel, receiver devices can be configured to receive such time-critical warnings without shortening their battery life.

Figure 10:
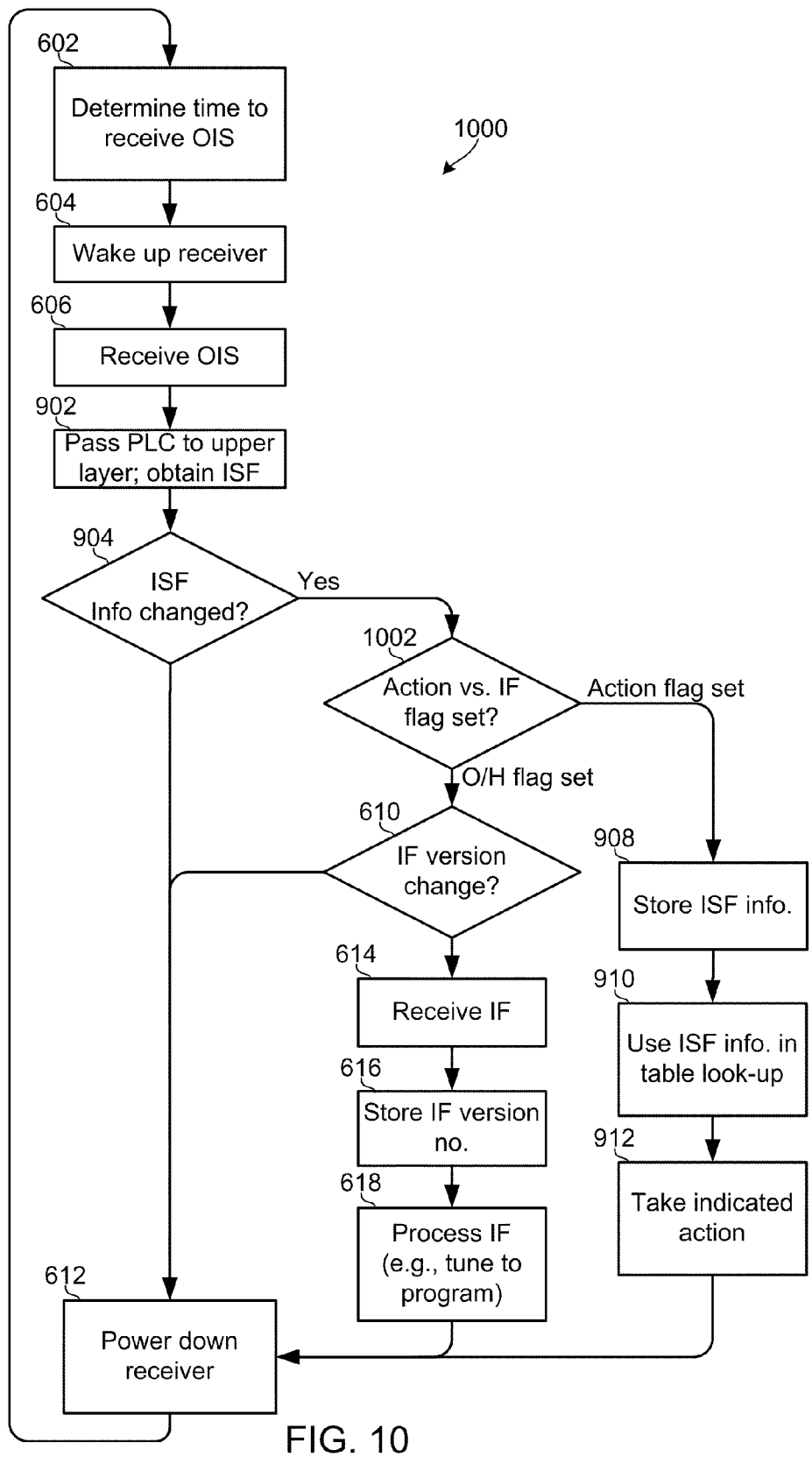
FIG. 10 is a process flow diagram of an embodiment method for receiving information flow version numbers and alerts or other types of application information in the PLC.

FIG. 10 illustrates an embodiment method 1000 for processing data communicated in the power-efficient logical channel for use in determining when an overhead information flow has changed and for activating a number of functions or applications in receiver devices. In method 1000 at block 602, the receiver device may determine when it is time to receive the OIS. When it is time to receive the OIS, at block 604, the receiver device may wake up the receiver, and receive the OIS portion of the next superframe at block 606. At block 902, the receiving device obtains the data communicated in the power-efficient logical channels. At determination block 904, the receiving device may determine whether the data communicated in the information summary flows mapped to the power-efficient logical channels has changed by comparing the newly received information summary flow data to the information summary flow data that was stored in memory the last time that the receiver device took action on the information summary flow data. If the information summary flow data has not changed (i.e., determination block 904="No"), the receiver device may power down the receiver at block 612, and begin the countdown to the next time the OIS should be received by returning to block 602.

If the information summary flow data has changed (i.e., determination block 904="Yes"), the receiver device may determine whether the information summary flow data received from the power-efficient logical channels indicates a change in the version number of an overhead content flow or a code to be interpreted as a function or display message at determination block 1002. This process may involve checking a single bit within the received code or data which may serve as a flag indicating the nature of the information summary flow data. For example, the most significant bit in a one or two byte code transmitted in the power-efficient logical channel may be used as a flag for this purpose. Thus, if the most significant bit is a "0" (for example) this may indicate that the information summary flow data includes a version number of the overhead flow, and if the most significant bit is a "1" (for example) this may indicate that the information summary flow data includes a code to be used in a table look up routine to determine an action to be implemented by the receiver device, such as a function to be executed or a message to be displayed.

If the receiver device determines that the data in the information summary flow received from the power-efficient logical channels includes an information flow version number (i.e., determination 1002="O/H flag set"), at determination block 610 the receiving device may determine whether the information flow version number has changed by comparing the newly received information flow version number to the version number stored in memory of the last information flow was received. If the information flow version number has not changed (i.e., determination block 610="No"), the receiver device may power down the receiver at block 612, and begin the countdown to the next time the OIS should be received by returning to block 602. If the information flow version has changed (i.e., determination block 610="Yes"), the receiver device may direct the transport layer to receive and decode the information flow at block 614. At block 616, the receiving device may store the information flow version number, and process the newly received information flow in a conventional manner at block 618, before powering down the receiver at block 612, and beginning the countdown to the next time the OIS should at block 602.

If the receiver device determines that the data received in the information summary flow from the power-efficient logical channels includes a code for a function or message (i.e. determination 1002="Action flag set"), the remainder of the one or two bytes of PLC data may be stored in memory at block 908. At block 910, the receiver device may use the data received in the information summary flow from the power-efficient logical channels to perform a table lookup using a data table of predefined actions to be implemented (e.g., functions to be executed or messages to be displayed) based upon the received information summary flow data. At block 912, the receiving device may implement the predetermined function or display the message that corresponds to the data code received in the power-efficient logical channels. Thereafter, the receiver device may power down the receiver at block 612 to conserve battery power and begin the countdown to the next time the OIS should be received by returning to block 602.

In a further embodiment, the receiver device may be configured so that users can limit the number of information summary flows that are monitored using the power-efficient logical channels. Typical users will be interested only in a subset of the information broadcasted on a mobile broadcast system. To accommodate this, multiple information summary flows can be configured in the broadcast system so that users can only monitor the information flows that carry information relevant to them. The receiver devices may be configured so that users can determine the information flows to be monitored using data communicated within the power-efficient logical channels so that only the information summary flows that are relevant to the user are received. The update information enabled by multiple information summary flows can further save receiver device power.

Figure 11A:
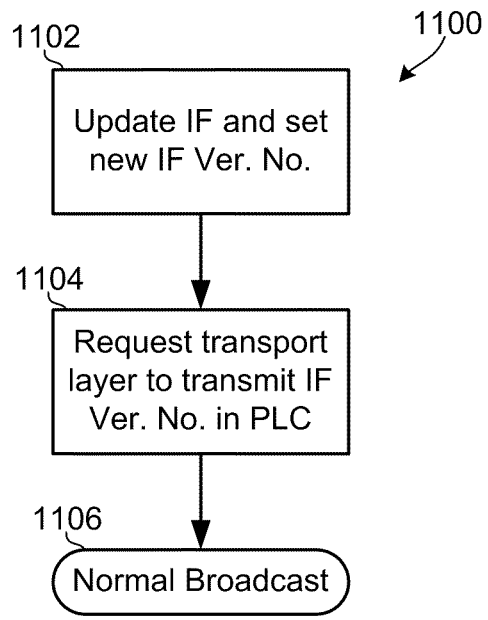
FIGS. 11A and 11B are process flow diagrams of embodiment methods for inserting information flow version number and alert information in the PLC for broadcast as part of a multiplexed broadcast signal.

The various embodiments can be implemented using simple processing at the headend of a broadcast system to include the appropriate data within the power-efficient logical channels. For example, FIG. 11A illustrates an example method 1100 for implementation in a server controlling broadcast content within a broadcast network to include an information flow version number in the power-efficient logical channels. In method 1100 at block 1102, the server may update the information flow and associate a new version number with the updated information flow. At block 1104, the server may provide the new version number to the transport layer requesting that this new version number be transmitted in the power-efficient logical channels. At block 1106 the broadcast signal may be generated and transmitted in the normal manner.

Figure 11B:
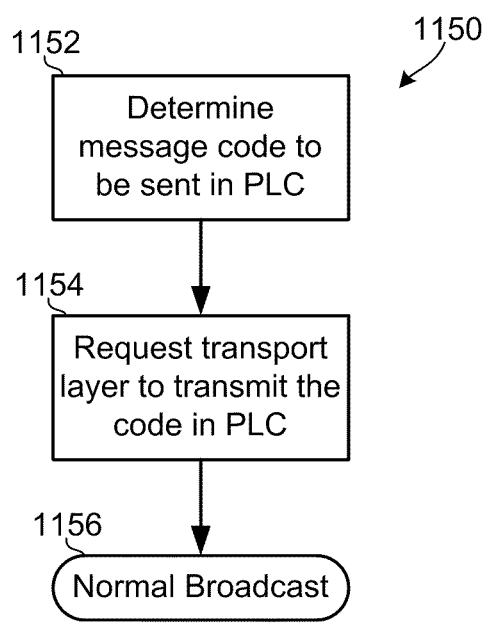

As another example, FIG. 11B illustrates an example method 1150 for implementation in a server controlling broadcast content within a broadcast network for including a message code within the power-efficient logical channels. In method 1150 at block 1152, the server may determine a message code that should be sent in the power-efficient logical channels. This determination may be made in response to receiving a message from an outside authority, such as to include transmission of an emergency alert or other type of public service announcement. This determination also may involve performing a table lookup to determine the appropriate code to insert into the power-efficient logical channels. At block 1154, the server may provide the determined message code to the transport layer, requesting that this code be transmitted in the power-efficient logical channels. At block 1156 the broadcast signal may be generated and transmitted in the normal manner.

Figure 12:
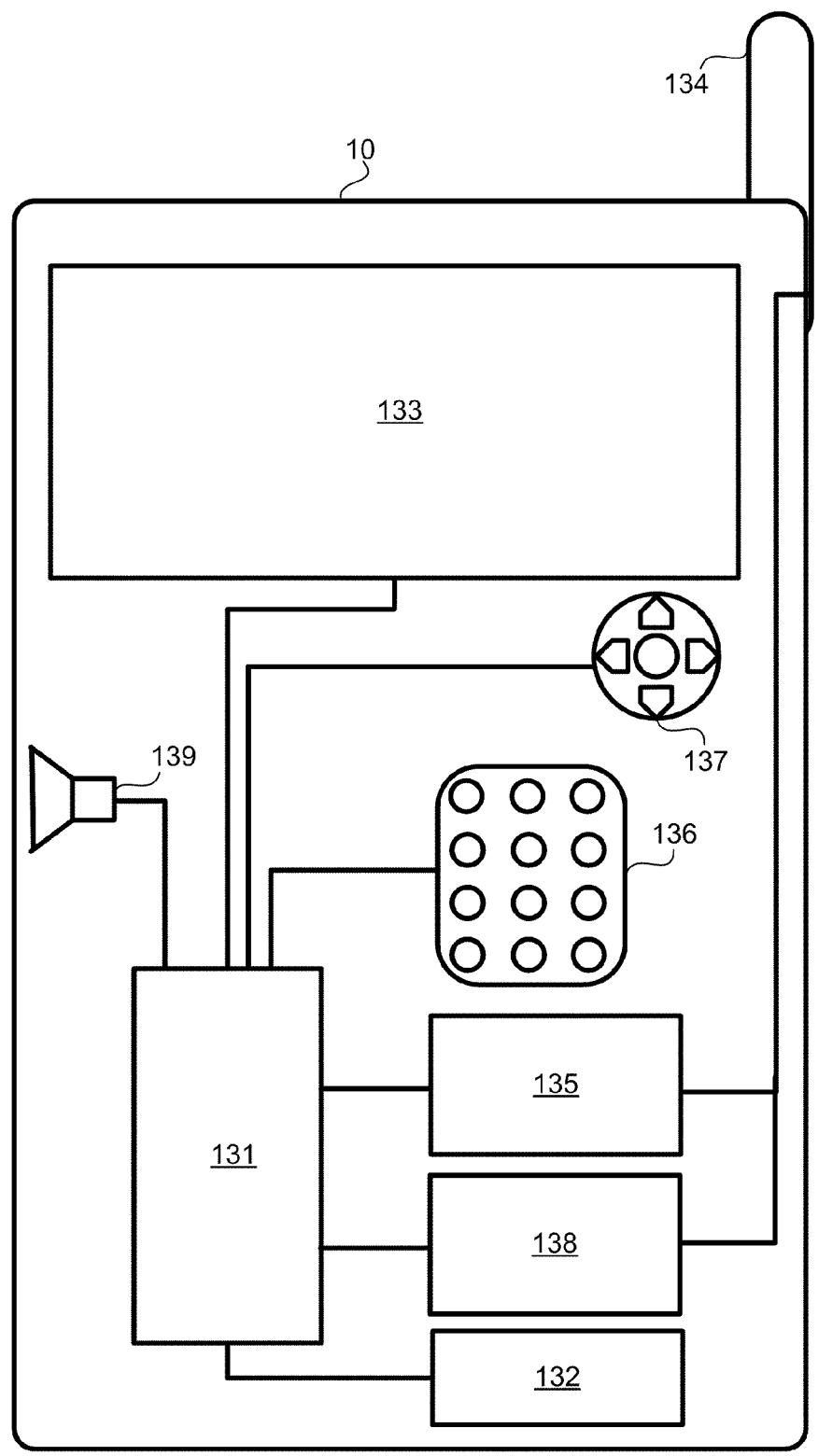
FIG. 12 is a component block diagram of a mobile device suitable for use in an embodiment.

Typical mobile devices 10 suitable for use with the various embodiments will have in common the components illustrated in FIG. 12. For example, an exemplary mobile receiver device 10 may include a processor 131 coupled to internal memory 132, a display 133, and to a speaker 139. Additionally, the mobile device 10 may have an antenna 134 for sending and receiving electromagnetic radiation that is connected to a wireless data link and/or cellular telephone transceiver 135 coupled to the processor 131 and a mobile multimedia broadcast receiver 138 coupled to the processor 131. Mobile devices typically also include a key pad 136 or miniature keyboard and menu selection buttons or rocker switches 137 for receiving user inputs.

The processor 131 may be any programmable microprocessor, microcomputer or multiple processor chip or chips that can be configured by software instructions (applications) to perform a variety of functions, including the functions of the various embodiments described herein. In some mobile devices, multiple processors 131 may be provided, such as one processor dedicated to wireless communication functions and one processor dedicated to running other applications. Typically, software applications may be stored in the internal memory 132 before they are accessed and loaded into the processor 131. In some mobile devices, the processor 131 may include internal memory sufficient to store the application software instructions. In some mobile devices, the secure memory may be in a separate memory chip coupled to the processor 131. In many mobile devices 10, the internal memory 132 may be a volatile or nonvolatile memory, such as flash memory, or a mixture of both. For the purposes of this description, a general reference to memory refers to all memory accessible by the processor 131, including internal memory 132, removable memory plugged into the mobile device, and memory within the processor 131 itself.

Figure 13:
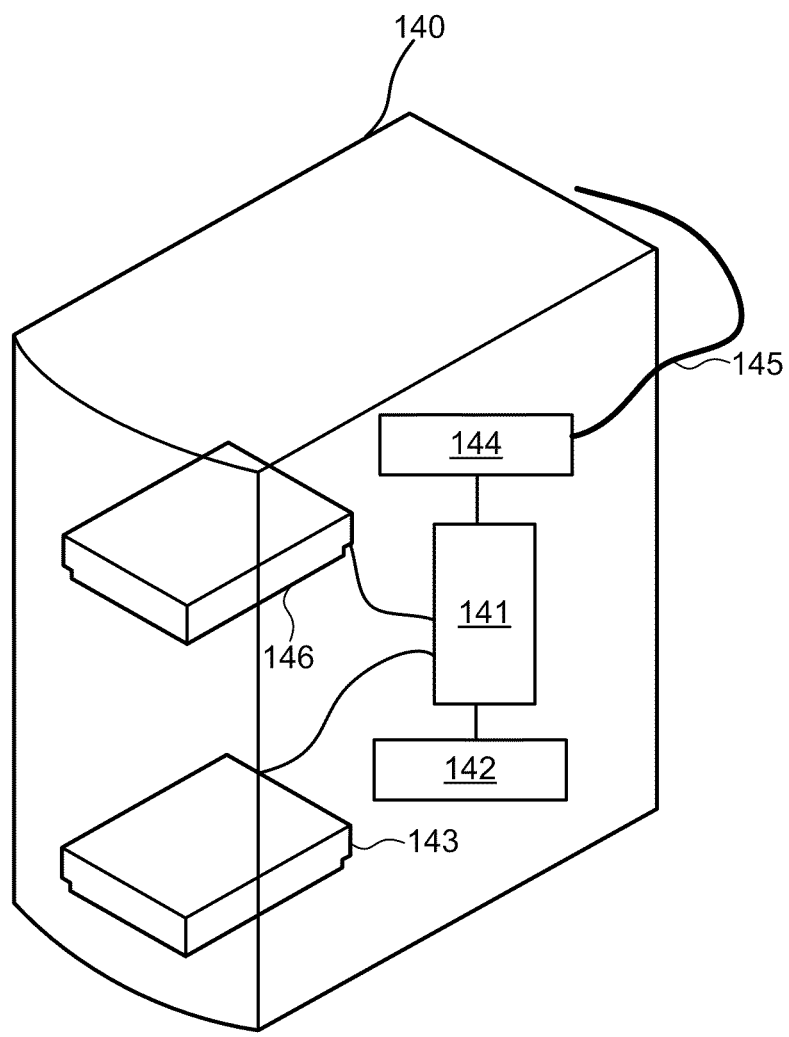
FIG. 13 is a component block diagram of a server device suitable for use in an embodiment.

A number of the embodiments described above may also be implemented with any of a variety of commercially available remote server devices, such as the server 140 illustrated in FIG. 13. Such a server 140 typically includes a processor 141 coupled to volatile memory 142 and a large capacity nonvolatile memory, such as a disk drive 143. The server 140 may also include a floppy disc drive and/or a compact disc (CD) drive 146 coupled to the processor 141. The server 140 may also include network access ports 144 coupled to the processor 141 for establishing data connections with a network 145, such as the Internet.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for providing one or more power-efficient information summary flows within a mobile multimedia broadcast system, comprising:
   including one or more power-efficient logical channels within an overhead information service portion of a broadcast signal, the power-efficient logical channels including data that may be mapped to one or more information summary flows;
   activating a receiver circuit within a receiver device to receive the overhead information service portion of the broadcast signal;
   obtaining the one or more power-efficient logical channels from the received overhead information service;
   passing data received in the obtained one or more power-efficient logical channels to an upper protocol layer of the receiver device to obtain the one or more information summary flows;
   determining, by the upper protocol layer, from the obtained one or more information summary flows whether an information flow within the broadcast signal should be received by the receiver device; and
   activating the receiver circuit in the receiver device to receive, at a lower protocol layer, the information flow when it is determined that the information flow should be received.

2. The method of claim 1 wherein the
   determining from the obtained one or more information summary flows determines whether an information flow within the broadcast signal has changed since a last time the information flow was received by the receiver device; and
   wherein the activating the receiver circuit in the receiver device to receive the information flow activates when it is determined that the information flow has changed since the last time the information flow was received.

3. The method of claim 2, wherein:
   the one or more information summary flows comprise a version number of the information flow included within the broadcast signal; and
   the determining from the obtained one or more information summary flows whether the information flow has changed comprises comparing a received version number to a version number stored in memory the last time the information flow was received by the receiver device, the method further comprising storing the received version number in memory when it is determined that the information flow has changed since the last time the information flow was received.

4. The method of claim 2, wherein including one or more power-efficient logical channels within an overhead information service portion of a broadcast signal comprises including a plurality of power-efficient logical channels within the overhead information service, each of the plurality of power-efficient logical channels mapped to a respective one of a plurality of information summary flows each corresponding to a respective one of a plurality of information flows included in the broadcast signal, the method further comprising:
   incrementally selecting each of the plurality of information summary flows;
   determining from each selected information summary flow whether a corresponding one of the plurality of information flows within the broadcast signal has changed since a last time the corresponding information flow was received by the receiver; and
   powering down the receiver when all of the plurality of information summary flows have been selected and evaluated.

5. The method of claim 4, wherein the plurality of power-efficient logical channels is formatted in the overhead information service in the form of a number of included power-efficient logical channels and each power-efficient logical channel includes a payload portion and a payload size portion, the payload portion containing information that is provided to the upper protocol layer of the receiver device.

6. The method of claim 1, wherein the one or more information summary flows include one of an information flow version number and a code, the method further comprising:
   including a code within the overhead information service when a receiver device should implement an action;
   determining whether one of the information summary flows includes an information flow version number corresponding to an information flow or a code indicating an action that should be implemented by the receiver device;
   when the one of the information summary flows includes a code, using the code to determine the action that should be implemented by the receiver device, implementing the determined action on the receiver device; and
   when the one of the information summary flows includes an information flow version number:
   comparing the information flow version number to a version number stored in memory a last time the information flow was received by the receiver device;
   activating the receiver circuit in the receiver device to receive the corresponding information flow when the information flow version number is different from the version number stored in memory the last time the information flow was received; and
   storing the information flow version number in memory.

7. The method of claim 1, further comprising:
   obtaining a code within the obtained one or more information summary flows;
   using the code to determine an action that should be implemented by the receiver device.

8. The method of claim 7, wherein using the code to determine an action that should be implemented by the receiver device comprises:
   using the code in a table lookup operation to determine an action corresponding to the code within a data table; and
   implementing the determined corresponding action by the receiver device.

9. The method of claim 7, further comprising:
   determining whether the code has changed since a last time the information summary flow was processed by the receiver device;
   powering down the receiver when the code has not changed since the last time the information summary flow was processed by the receiver device; and
   when the code has changed since the last time the information summary flow was processed by the receiver device:
   storing the received code in memory;
   using the code to determine an action that the receiver device should implement; and
   implementing the determined action by the receiver device.

10. The method of claim 9, wherein the action implemented by the receiver device is selected from the group: displaying a particular message; sounding a particular audible alarm;
   receiving a particular information flow; receiving a particular content flow; and combinations of thereof.

11. A mobile multimedia broadcast system, comprising:
a mobile multimedia broadcast network configured to broadcast mobile multimedia broadcast signals including one or more power-efficient logical channels within an overhead information service portion of the broadcast signals, the power-efficient logical channels including data that may be mapped to one or more information summary flows; and
a receiver device configured with processor-executable instructions to perform operations comprising:
activating a receiver circuit within the receiver device to receive the overhead information service portion of the broadcast signals;
obtaining the one or more power-efficient logical channels from the received overhead information service;
passing data received in the obtained one or more power-efficient logical channels to an upper protocol layer of the receiver device to obtain the one or more information summary flows;
determining, by the upper protocol layer, from the obtained one or more information summary flows whether an information flow within the broadcast signal should be received by the receiver device; and
activating the receiver circuit in the receiver device to receive, at a lower protocol layer, the information flow when it is determined that the information flow should be received.

12. The mobile multimedia broadcast system of claim 11, wherein the
determining from the obtained one or more information summary flows determines whether an information flow within the broadcast signals has changed since a last time the information flow was received by the receiver device; and
wherein the activating the receiver circuit in the receiver device to receive the information flow activates when it is determined that the information flow has changed since the last time the information flow was received.

13. The mobile multimedia broadcast system of claim 12, wherein:
the mobile multimedia broadcast network is further configured such that the one or more information summary flows comprise a version number of the information flow included within the broadcast signal;
the receiver device is configured with processor-executable instructions such that the determining from the obtained one or more information summary flows whether the information flow has changed comprises comparing a received version number to a version number stored in memory the last time the information flow was received by the receiver device; and
the receiver device is configured with processor-executable instructions to perform operations further comprising storing the received version number in memory when it is determined that the information flow has changed since the last time the information flow was received.

14. The mobile multimedia broadcast system of claim 12, wherein:
the mobile broadcast network is configured such that including one or more power efficient logical channels within an overhead information service portion of a broadcast signal comprises including a plurality of power-efficient logical channels within the overhead information service, each of the plurality of power-efficient logical channels mapped to a respective one of a plurality of information summary flows each corresponding to a respective one of a plurality of information flows included in the broadcast signal; and
the receiver device is configured with processor-executable instructions to perform operations further comprising:
incrementally selecting each of the plurality of information summary flows;
determining from each selected information summary flow whether a corresponding one of the plurality of information flows with in the broadcast signal has changed since a last time the corresponding information flow was received by the receiver; and
powering down the receiver when all of the plurality of information summary flows have been selected and evaluated.

15. The mobile multimedia broadcast system of claim 14, wherein the plurality of power-efficient logical channels is formatted in the overhead information service in the form of a number of included power-efficient logical channels and each power-efficient logical channel includes a payload portion and a payload size portion, the payload portion containing information that is provided to the upper protocol layer of the receiver device.

16. The mobile multimedia broadcast system of claim 11, wherein:
the mobile broadcast network is configured such that the one or more information summary flows include one of an information flow version number and a code; and
the receiver device is configured with processor-executable instructions to perform operations further comprising:
including a code within the overhead information service when a receiver device should implement an action;
determining whether one of the information summary flows includes an information flow version number corresponding to an information flow or a code indicating an action that should be implemented by the receiver device;
when the one of the information summary flows includes a code, using the code to determine the action that should be implemented by the receiver device, and implementing the determined action on the receiver device; and
when the one of the information summary flows includes an information flow version number:
comparing the information flow version number to a version number stored in memory a last time the information flow was received by the receiver device;
activating the receiver circuit in the receiver device to receive the corresponding information flow when the information flow version number is different from the version number stored in memory the last time the information flow was received; and
storing the information flow version number in memory.

17. The mobile multimedia broadcast system of claim 11, wherein the receiver device is configured with processor-executable instructions to perform operations further comprising:
obtaining a code within the obtained one or more information summary flows; and
using the code to determine an action that should be implemented by the receiver device.

18. The mobile multimedia broadcast system of claim 17, wherein the receiver device is configured with processor-executable instructions such that using the code to determine an action that should be implemented by the receiver device comprises:
using the code in a table lookup operation to determine an action corresponding to the code within a data table; and implementing the determined corresponding action by the receiver device.

19. The mobile multimedia broadcast system of claim 17, wherein the receiver device is configured with processor-executable instructions such that using the code to determine an action that should be implemented by the receiver device comprises:
   determining whether the code has changed since a last time the information summary flow was processed by the receiver device;
   powering down the receiver when the code has not changed since the last time the information summary flow was processed by the receiver device; and
   when the code has changed since the last time the information summary flow was processed by the receiver device:
   storing the received code in memory;
   using the code to determine an action that the receiver device should implement; and
   implementing the determined action by the receiver device.

20. The mobile multimedia broadcast system of claim 19, wherein the mobile broadcast network is configured such that the action implemented by the receiver device is selected from the group: displaying a particular message; sounding a particular audible alarm; receiving a particular information flow; receiving a particular content flow; and combinations of thereof.

21. A mobile multimedia broadcast system, comprising:
   means for including one or more power-efficient logical channels within an overhead information service portion of a broadcast signal, the power-efficient logical channels including data that may be mapped to one or more information summary flows; and
   receiver means for receiving the overhead information service portion of the broadcast signal;
   means for obtaining the one or more power-efficient logical channels from the received overhead information service;
   means for passing data received in the obtained one or more power-efficient logical channels to an upper protocol layer of the receiver means to obtain the one or more information summary flows;
   means for determining, by the upper protocol layer, from the obtained one or more information summary flows whether an information flow within the broadcast signal should be received by the receiver device; and
   means for activating the receiver circuit in the receiver device to receive, at a lower protocol layer, the information flow when it is determined that the information flow should be received.

22. The mobile multimedia broadcast system of claim 21 wherein the means for determining from the obtained one or more information summary flows determines whether an information flow within the broadcast signal has changed since a last time the information flow was received by the receiver device; and
   wherein the means for activating the receiver means to receive the information flow activates when it is determined that the information flow has changed since the last time the information flow was received.

23. The mobile multimedia broadcast system of claim 22, wherein:
   the one or more information summary flows comprise a version number of the information flow included within the broadcast signal;
   the means for determining from the obtained one or more information summary flows whether the information flow has changed comprises means for comparing a received version number to a version number stored in memory the last time the information flow was received by the receiver means; and
   the system further comprises means for storing the received version number when it is determined that the information flow has changed since the last time the information flow was received.

24. The mobile multimedia broadcast system of claim 22, wherein means for including one or more power-efficient logical channels within an overhead information service portion of a broadcast signal comprises means for including a plurality of power-efficient logical channels within the overhead information service, each of the plurality of power-efficient logical channels mapped to a respective one of a plurality of information summary flows each corresponding to a respective one of a plurality of information flows included in the broadcast signal, wherein the mobile multimedia broadcast system further comprises:
   means for incrementally selecting each of the plurality of information summary flows;
   means for determining from each selected information summary flow whether a corresponding one of the plurality of information flows with in the broadcast signal has changed since a last time the corresponding information flow was received by the receiver; and
   means for powering down the receiver means when all of the plurality of information summary flows have been selected and evaluated.

25. The mobile multimedia broadcast system of claim 24, wherein the plurality of power-efficient logical channels is formatted in the overhead information service in the form of a number of included power-efficient logical channels and each power-efficient logical channel includes a payload portion and a payload size portion, the payload portion containing
   information that is provided to the upper protocol layer of the receiver device.

26. The mobile multimedia broadcast system of claim 23, wherein the one or more information summary flows include one of an information flow version number and a code, the system further comprising:
   means for including a code within the overhead information service when a receiver device should implement an action;
   means for determining whether one of the information summary flows includes an information flow version number corresponding to an information flow or a code indicating an action that should be implemented;
   means for using a code included in the information summary flows to determine the action that should be implemented and means for implementing the determined action; and
   means for comparing an information flow version number to a version number stored in memory a last time the information flow was received, activating the receiver means to receive the corresponding information flow when the information flow version number is different from the version number stored in memory the last time the information flow was received, and storing the information flow version number when it is determined that the one of the information summary flows includes an information flow version number.

27. The mobile multimedia broadcast system of claim 21, further comprising:
   means for obtaining a code within the obtained one or more information summary flows; and means for using the code to determine an action that should be implemented by the receiver means.

28. The mobile multimedia broadcast system of claim 27, wherein means for using the code to determine an action that should be implemented by the receiver means comprises:
   means for using the code in a table lookup operation to determine an action corresponding to the code within a data table; and
   means for implementing the determined corresponding action by the receiver means.

29. The mobile multimedia broadcast system of claim 27, wherein means for using the code to determine an action that should be implemented by the receiver device comprises:
   means for determining whether the code has changed since a last time the information summary flow was processed;
   means for powering down the receiver means when the code has not changed since the last time the information summary flow was processed;
   means for storing the received code when the code has changed since the last time the information summary flow was processed:
      means for using the code to determine an action that should be implemented; and
      means for implementing the determined action.

30. The mobile multimedia broadcast system of claim 29, wherein the action to be implemented is selected from the group: displaying a particular message; sounding a particular audible alarm; receiving a particular information flow; receiving a particular content flow; and
   combinations of thereof.

31. A mobile multimedia broadcast receiver device, comprising:
   a processor;
   a memory coupled to the processor; and
   a receiver circuit coupled to the processor and configured to receive mobile multimedia broadcast transmissions,
   wherein the processor is configure with processor-executable instructions to perform operations comprising:
      activating the receiver circuit to receive the overhead information service portion of the mobile multimedia broadcast transmissions;
      obtaining the one or more power-efficient logical channels from the received overhead information service;
      passing data received in the obtained one or more power-efficient logical channels to an upper protocol layer to obtain the one or more information summary flows;
      determining, by the upper protocol layer from the obtained one or more information summary flows, whether an information flow within the broadcast signal should be received by the receiver device;
      activating the receiver circuit in the receiver device to receive, at a lower protocol layer, the information flow when it is determined that the information flow should be received.

32. The mobile multimedia broadcast receiver device of claim 31, wherein the determining from the obtained one or more information summary flows determines whether an information flow within the broadcast signal has changed since a last time the information flow was received by the receiver device; and
   wherein the activating the receiver circuit in the receiver device to receive the information flow activates when it is determined that the information flow has changed since the last time the information flow was received.

33. The mobile multimedia broadcast receiver device of claim 32, wherein:
   the one or more information summary flows comprise a version number of the information flow included within the broadcast signal;
   the processor is configured with processor-executable instructions such that the determining from the obtained one or more information summary flows whether the information flow has changed comprises comparing a received version number to a version number stored in memory the last time the information flow was received by the receiver device; and
   the processor is configured with processor-executable instructions to perform operations further comprising storing the received version number in memory when it is determined that the information flow has changed since the last time the information flow was received.

34. The mobile multimedia broadcast receiver device of claim 32 wherein:
   one or more power-efficient logical channels are included within an overhead information service portion of mobile multimedia broadcast transmissions including a plurality of power-efficient logical channels within the overhead information service, each of the plurality of power-efficient logical channels mapped to a respective one of a plurality of information summary flows each corresponding to a respective one of a plurality of information flows included in the broadcast signal; and
   the processor is configured with processor-executable instructions to perform operations further comprising:
      incrementally selecting each of the plurality of information summary flows;
      determining from each selected information summary flow whether a corresponding one of the plurality of information flows with in the broadcast signal has changed since a last time the corresponding information flow was received by the receiver; and
      powering down the receiver circuit when all of the plurality of information summary flows have been selected and evaluated.

35. The mobile multimedia broadcast receiver device of claim 34, wherein the plurality of power-efficient logical channels is formatted in the overhead information service in the form of a number of included power-efficient logical channels and each power-efficient logical channel includes a payload portion and a payload size portion, the payload portion containing information that is provided to the upper protocol layer of the receiver device.

36. The mobile multimedia broadcast receiver device of claim 31, wherein:
   the one or more information summary flows include one of an information flow version number and a code; and
   the processor is configured with processor-executable instructions to perform operations further comprising:
      determining whether one of the information summary flows includes an information flow version number corresponding to an information flow or a code indicating an action that should be implemented by the receiver device;
      when the one of the information summary flows includes a code, using the code to determine the action that should be implemented by the receiver device, and implementing the determined action on the receiver device; and when the one of the information summary flows includes an information flow version number:
comparing the information flow version number to a version number stored in memory a last time the information flow was received by the receiver device;
activating the receiver circuit to receive the corresponding information flow when the information flow version number is different from the version number stored in memory the last time the information flow was received; and
storing the information flow version number in memory.

37. The mobile multimedia broadcast receiver device of claim 31, wherein the processor is configured with processor-executable instructions to perform operations further comprising:
obtaining a code within the obtained one or more information summary flows; and
using the code to determine an action that should be implemented by the receiver device.

38. The mobile multimedia broadcast receiver device of claim 37, wherein the processor is configured with processor-executable instructions such that using the code to determine an action that should be implemented by the receiver device comprises:
using the code in a table lookup operation to determine an action corresponding to the code within a data table; and
implementing the determined corresponding action by the receiver device.

39. The mobile multimedia broadcast receiver device of claim 37, wherein the processor is configured such that using the code to determine an action that should be implemented by the receiver device comprises:
determining whether the code has changed since a last time the information summary flow was processed by the receiver device;
powering down the receiver circuit when the code has not changed since the last time the information summary flow was processed by the receiver device; and
when the code has changed since the last time the information summary flow was processed by the receiver device:
storing the received code in memory;
using the code to determine an action that the receiver device should implement; and
implementing the determined action by the receiver device.

40. The mobile multimedia broadcast receiver device of claim 39, wherein the processor is configured such that the action implemented by the receiver device is selected from the group: displaying a particular message; sounding a particular audible alarm; receiving a particular information flow; receiving a particular content flow; and combinations of thereof.

41. A mobile multimedia broadcast receiver device, comprising:
means for receiving an overhead information service portion of a mobile multimedia broadcast signal;
means for obtaining the one or more power-efficient logical channels from the received overhead information service;
means for passing data received in the obtained one or more power-efficient logical channels to an upper protocol layer of the receiver device to obtain the one or more information summary flows;
means for determining, by the upper protocol layer, from the obtained one or more information summary flows whether an information flow within the broadcast signal should be received by the receiver device; and
means for activating the receiver circuit in the receiver device to receive, at a lower protocol layer, the information flow when it is determined that the information flow should be received.

42. The mobile multimedia broadcast receiver device of claim 41, wherein the means for determining from the obtained one or more information summary flows determines whether an information flow within the broadcast signal has changed since a last time the information flow was received by the receiver device; and
means for receiving the information flow when it is determined that the information flow has changed since the last time the information flow was received.

43. The mobile multimedia broadcast receiver device of claim 42, wherein:
the one or more information summary flows comprise a version number of the information flow included within the broadcast signal;
the means for determining from the obtained one or more information summary flows whether the information flow has changed comprises means for comparing a received version number to a version number stored in memory the last time the information flow was received by the receiver device; and
the mobile multimedia broadcast receiver device further comprises means for storing the received version number in memory when it is determined that the information flow has changed since the last time the information flow was received.

44. The mobile multimedia broadcast receiver device of claim 42, wherein the one or more power-efficient logical channels within an overhead information service portion of a broadcast signal includes a plurality of power-efficient logical channels within the overhead information service, each of the plurality of power-efficient logical channels mapped to a respective one of a plurality of information summary flows each corresponding to a respective one of a plurality of information flows included in the broadcast signal, the mobile multimedia broadcast receiver device further comprising:
means for incrementally selecting each of the plurality of information summary flows;
means for determining from each selected information summary flow whether a corresponding one of the plurality of information flows with in the broadcast signal has changed since a last time the corresponding information flow was received by the receiver; and
means for powering down a receiver circuitry when all of the plurality of information summary flows have been selected and evaluated.

45. The mobile multimedia broadcast receiver device of claim 44, further comprising means for parsing each of the plurality of power-efficient logical channels to obtain a payload portion and a payload size portion, and providing information in the payload portion to the upper protocol layer of the receiver device.

46. The mobile multimedia broadcast receiver device of claim 41, wherein the one or more information summary flows include one of an information flow version number and a code, the mobile multimedia broadcast receiver device further comprising:
means for determining whether one of the information summary flows includes an information flow version number corresponding to an information flow or a code indicating an action that should be implemented by the receiver device;

means for using a code included in the information summary flows to determine the action that should be implemented by the receiver device and means for implementing the determined action on the receiver device when it is determined that the one of the information summary flows includes a code;

means for comparing an information flow version number to a version number stored in memory a last time the information flow was received by the receiver device, activating the receiver circuit in the receiver device to receive the corresponding information flow when the information flow version number is different from the version number stored in memory the last time the information flow was received, and storing the information flow version number in memory when it is determined that the one of the information summary flows includes an information flow version number.

47. The mobile multimedia broadcast receiver device of claim 41, further comprising:

means for obtaining a code within the obtained one or more information summary flows; and means for using the code to determine an action that should be implemented by the receiver device.

48. The mobile multimedia broadcast receiver device of claim 47, wherein means for using the code to determine an action that should be implemented by the receiver device comprises:

means for using the code in a table lookup operation to determine an action corresponding to the code within a data table; and means for implementing the determined corresponding action by the mobile multimedia broadcast receiver device.

49. The mobile multimedia broadcast receiver device of claim 47, wherein means for using the code to determine an action that should be implemented by the mobile multimedia broadcast receiver device comprises:

means for determining whether the code has changed since a last time the information summary flow was processed by the mobile multimedia broadcast receiver device;

means for powering down a receiver circuitry when the code has not changed since the last time the information summary flow was processed by the mobile multimedia broadcast receiver device;

means for storing the received code when the code has changed since the last time the information summary flow was processed by, the mobile multimedia broadcast receiver device;

means for using the code to determine an action that the mobile multimedia broadcast receiver device should implement; and means for implementing the determined action by the mobile multimedia broadcast receiver device.

50. The mobile multimedia broadcast receiver device of claim 49, wherein the action implemented by the mobile multimedia broadcast receiver device is selected from the group: displaying a particular message; sounding a particular audible alarm;

receiving a particular information flow; receiving a particular content flow; and combinations of thereof.

51. A non-transitory processor-readable storage medium having stored thereon processor-executable instructions comprising:

at least one instruction for receiving an overhead information service portion of a mobile multimedia broadcast signal;

at least one instruction for obtaining the one or more power-efficient logical channels from the received overhead information service;

at least one instruction for passing data received in the obtained one or more power-efficient logical channels to an upper protocol layer of the receiver device to obtain the one or more information summary flows;

at least one instruction for determining, by the upper protocol layer, from the obtained one or more information summary flows whether an information flow within the broadcast signal should be received by the receiver device; and at least one instruction for activating the receiver circuit in the receiver device to receive, at a lower protocol layer, the information flow when it is determined that the information flow should be received.

52. The non-transitory processor-readable storage medium of claim 51, wherein the at least one instruction for determining from the obtained one or more information summary flows determines whether an information flow within the broadcast signal has changed since a last time the information flow was received by the receiver device; and at least one instruction for receiving the information flow when it is determined that the information flow has changed since the last time the information flow was received.

53. The non-transitory processor-readable storage medium of claim 52, wherein:

the one or more information summary flows comprise a version number of the information flow included within the broadcast signal;

the at least one instruction for determining from the obtained one or more information summary flows whether the information flow has changed comprises at least one instruction for comparing a received version number to a version number stored in memory the last time the information flow was received by the receiver device; and the processor-executable instructions stored on the processor-readable storage medium further comprise at least one instruction for storing the received version number in memory when it is determined that the information flow has changed since the last time the information flow was received.

54. The non-transitory processor-readable storage medium of claim 52, wherein the one or more power-efficient logical channels within an overhead information service portion of a broadcast signal includes a plurality of power-efficient logical channels within the overhead information service, each of the plurality of power-efficient logical channels mapped to a respective one of a plurality of information summary flows each corresponding to a respective one of a plurality of information flows included in the broadcast signal, and wherein the processor-executable instructions stored on the processor-readable storage medium further comprise:

at least one instruction for incrementally selecting each of the plurality of information summary flows;

at least one instruction for determining from each selected information summary flow whether a corresponding one of the plurality of information flows with in the broadcast signal has changed since a last time the corresponding information flow was received by the receiver; and at least one instruction for powering down a receiver circuitry when all of the plurality of information summary flows have been selected and evaluated.

55. The non-transitory processor-readable storage medium of claim 54, wherein the processor-executable instructions stored on the processor-readable storage medium further comprise at least one instruction for parsing each of the plurality of power-efficient logical channels to obtain a payload portion and a payload size portion, and providing information in the payload portion to the upper protocol layer of the receiver device.

56. The non-transitory processor-readable storage medium of claim 51, wherein the one or more information summary flows include one of an information flow version number and a code, and
wherein the processor-executable instructions stored on the processor-readable storage medium further comprise:
at least one instruction for determining whether one of the information summary flows includes an information flow version number corresponding to an information flow or a code indicating an action that should be implemented by the receiver device;
at least one instruction for using a code included in the information summary flows to determine the action that should be implemented by the receiver device and means for implementing the determined action on the receiver device when it is determined that the one of the information summary flows includes a code;
at least one instruction for comparing an information flow version number to a version number stored in memory a last time the information flow was received by the receiver device, activating the receiver circuit in the receiver device to receive the corresponding information flow when the information flow version number is different from the version number stored in memory the last time the information flow was received, and storing the information flow version number in memory when it is determined that the one of the information summary flows includes an information flow version number.

57. The non-transitory processor-readable storage medium of claim 51, wherein the processor-executable instructions stored on the processor-readable storage medium further comprise:
at least one instruction for obtaining a code within the obtained one or more information summary flows; and
at least one instruction for using the code to determine an action that should be implemented by the receiver device.

58. The non-transitory processor-readable storage medium of claim 57, wherein the at least one instruction for using the code to determine an action that should be implemented by the receiver device comprises:
at least one instruction for using the code in a table lookup operation to determine an action corresponding to the code within a data table; and
at least one instruction for implementing the determined corresponding action by the mobile multimedia broadcast receiver device.

59. The non-transitory processor-readable storage medium of claim 57, wherein the at least one instruction for using the code to determine an action that should be implemented by the mobile multimedia broadcast receiver device comprises:
at least one instruction for determining whether the code has changed since a last time the information summary flow was processed by the mobile multimedia broadcast receiver device;
at least one instruction for powering down a receiver circuitry when the code has not changed since the last time the information summary flow was processed by the mobile multimedia broadcast receiver device;
at least one instruction for storing the received code when the code has changed since the last time the information summary flow was processed by the mobile multimedia broadcast receiver device;
at least one instruction for using the code to determine an action that the mobile multimedia broadcast receiver device should implement; and
at least one instruction for implementing the determined action by the mobile multimedia broadcast receiver device.

60. The non-transitory processor-readable storage medium of claim 59, wherein the processor-executable instructions stored on the processor-readable storage medium are configured such that the action implemented by the mobile multimedia broadcast receiver device is selected from the group: displaying a particular message; sounding a particular audible alarm; receiving a particular information flow; receiving a particular content flow; and combinations of thereof.

* * * * *